(12) United States Patent
Yang et al.

(10) Patent No.: US 9,338,775 B2
(45) Date of Patent: May 10, 2016

(54) METHOD FOR TRANSCEIVING CONTROL SIGNALS AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 27 days.

(21) Appl. No.: 14/399,455

(22) PCT Filed: May 31, 2013

(86) PCT No.: PCT/KR2013/004821
§ 371 (c)(1),
(2) Date: Nov. 6, 2014

(87) PCT Pub. No.: WO2013/180518
PCT Pub. Date: Dec. 5, 2013

(65) Prior Publication Data
US 2015/0110034 A1    Apr. 23, 2015

Related U.S. Application Data

(60) Provisional application No. 61/655,473, filed on Jun. 4, 2012, provisional application No. 61/657,006, filed on Jun. 7, 2012, provisional application No. 61/695,288, filed on Aug. 30, 2012, provisional (Continued)

(51) Int. Cl.
*H04W 72/04* (2009.01)
*H04L 1/18* (2006.01)
(Continued)

(52) U.S. Cl.
CPC ........... *H04W 72/042* (2013.01); *H04L 1/1671* (2013.01); *H04L 1/1861* (2013.01); *H04L 5/0055* (2013.01); *H04W 28/06* (2013.01); *H04W 72/12* (2013.01)

(58) Field of Classification Search
CPC .. H04W 72/042; H04W 72/12; H04L 1/1671; H04L 1/1861; H04L 5/0055
See application file for complete search history.

(56) References Cited

U.S. PATENT DOCUMENTS

2013/0064216 A1* 3/2013 Gao et al. ...................... 370/330
2013/0094458 A1* 4/2013 Sartori et al. .................. 370/329
(Continued)

OTHER PUBLICATIONS

Huawei, "PUCCH ACK/NACK resource allocation for ePDCCH", May 21-25, 2012, 3GPP TSG RAN WG1 Meeting #69, R1-121969, pp. 1-2.*

(Continued)

*Primary Examiner* — Paul H Masur
(74) *Attorney, Agent, or Firm* — Lee, Hong, Degerman, Kang & Waimey; Jonathan Kang; Harry Lee

(57) ABSTRACT

The present invention relates to a method and apparatus for transmitting an acknowledgement (ACK)/negative acknowledgement (NACK) signal in a wireless communication system. The method comprises the steps of: receiving downlink grant information through a physical downlink control channel; receiving downlink data through a physical downlink shared channel scheduled by the downlink grant information; and transmitting a downlink data ACK/NACK signal using a plurality of ACK/NACK resources including a first ACK/NACK resource and a second ACK/NACK resource. The physical downlink control channel is allocated to a data region of a subframe. The first ACK/NACK resource and the second ACK/NACK resource are determined to be the uplink resource linked to a first resource index and the uplink resource linked to a second resource index, respectively, from between the resource index constituting the physical downlink control channel and the resource index contained in the physical downlink shared channel.

14 Claims, 23 Drawing Sheets

Related U.S. Application Data application No. 61/727,062, filed on Nov. 15, 2012, provisional application No. 61/727,118, filed on Nov. 16, 2012, provisional application No. 61/727,123, filed on Nov. 16, 2012, provisional application No. 61/654,068, filed on May 31, 2012.

(51) Int. Cl.
*H04L 5/00* (2006.01)
*H04L 1/16* (2006.01)
*H04W 28/06* (2009.01)
*H04W 72/12* (2009.01)

(56) References Cited

U.S. PATENT DOCUMENTS

| | | | |
|---|---|---|---|
| 2013/0107861 A1* | 5/2013 | Cheng et al. | 370/331 |
| 2013/0114530 A1* | 5/2013 | Chen et al. | 370/329 |
| 2013/0242882 A1* | 9/2013 | Blankenship et al. | 370/329 |
| 2013/0242890 A1* | 9/2013 | He et al. | 370/329 |
| 2013/0242904 A1* | 9/2013 | Sartori et al. | 370/329 |
| 2013/0308568 A1* | 11/2013 | Chen et al. | 370/329 |
| 2015/0023264 A1* | 1/2015 | Tiirola et al. | 370/329 |

OTHER PUBLICATIONS

Catt, "PUCCH resource for E-PDCCH," 3GPP TSG RAN WG1 Meeting #69, R1-122052, May 2012, 1 page.
Samsung, "SORTD for PUCCH Format 1b with Channel Selection," 3GPP TSG RAN WG1 #69, R1-122218, May 2012, 2 pages.
Nokia Siemens Networks, et al., "HARQ-ACK resource allocation for data scheduled via ePDCCH," 3GPP TSG-RAN WG1 Meeting #69, R1-122428, May 2012, 2 pages.
Sharp, "PUCCH resource for ePDCCH," 3GPP TSG RAN WG1 Meeting #69, R1-122391, May 2012, 4 pages.
Pantech, "PUCCH resource allocation in response to E-PDCCH," 3GPP TSG RAN1 #69, R1-122456, May 2012, 3 pages.
PCT International Application No. PCT/KR2013/004821, Written Opinion of the International Searching Authority dated Sep. 25, 2013, 13 pages.
PCT International Application No. PCT/KR2013/004821, Written Opinion of the International Searching Authority dated Sep. 25, 2013, 16 pages.

* cited by examiner

PUCCH format 1a and 1b structure (normal CP case)

PUCCH format 1a and 1b structure (extended CP case)

Reuse of LTE PUCCH format 2 (normal CP case)

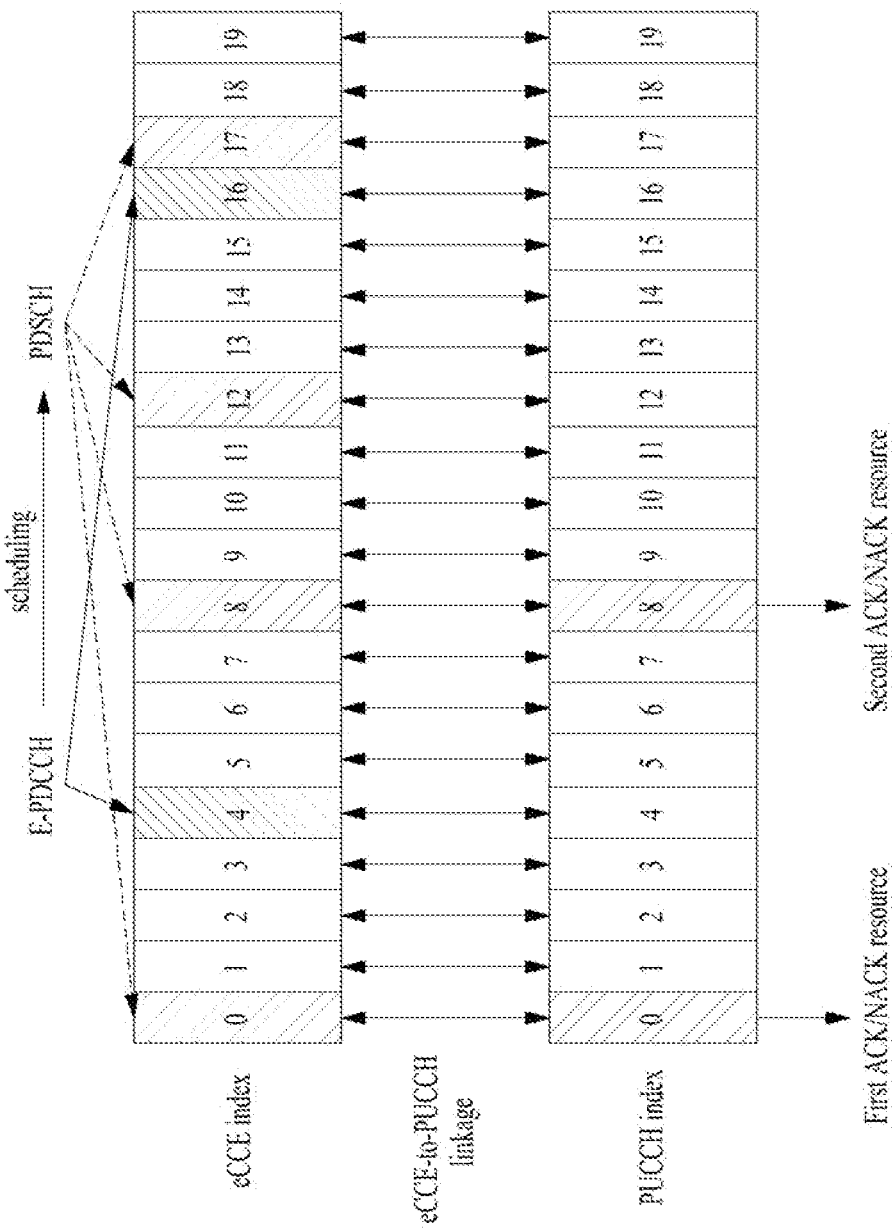

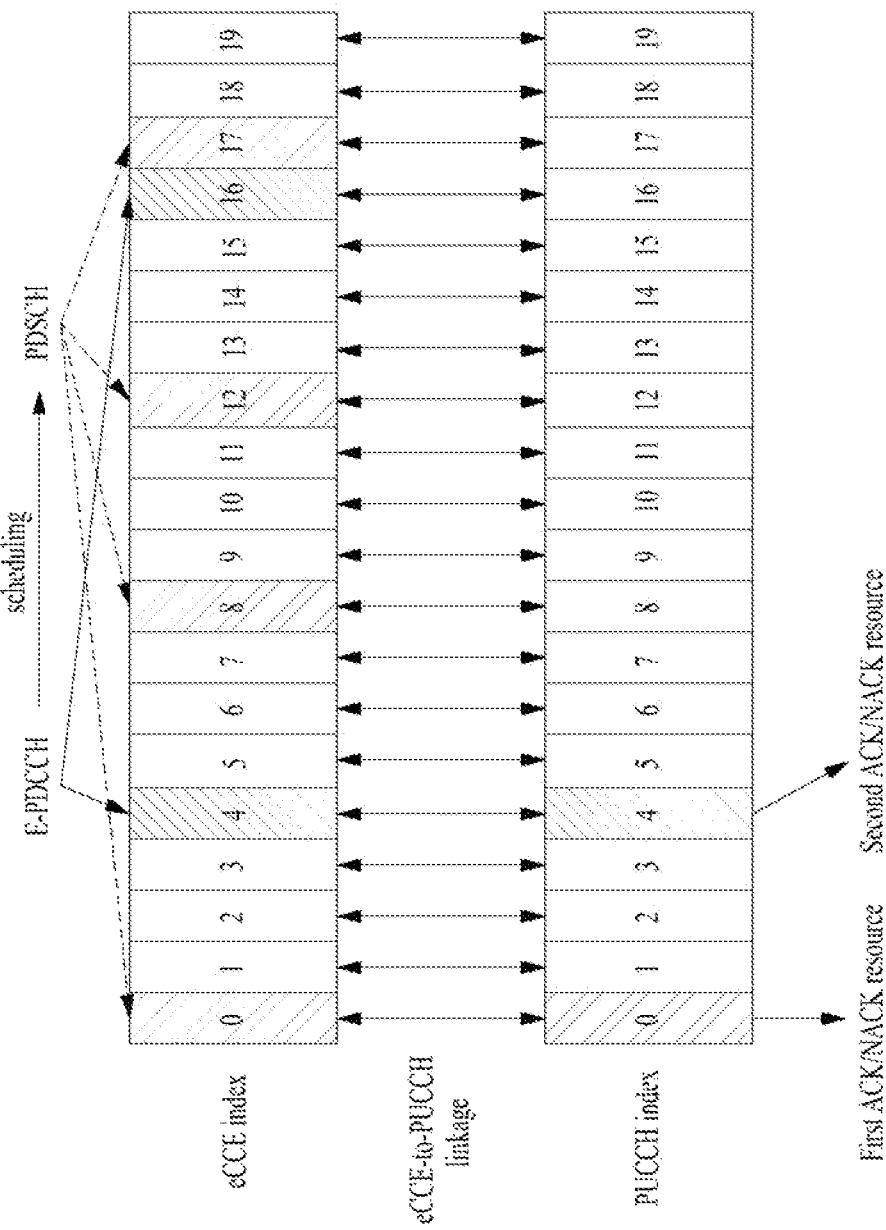

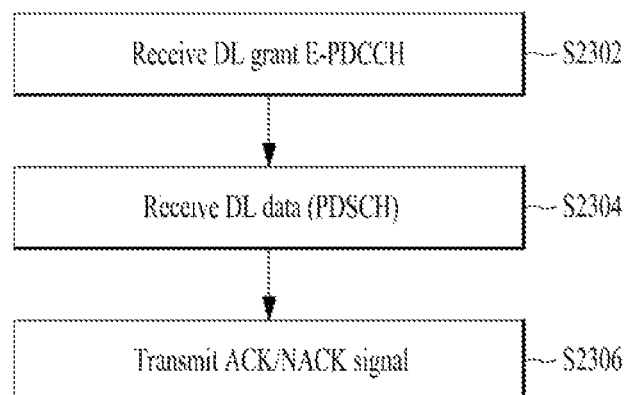

FIG. 23

* ARI signaling
  - When E-PDCCH schedules PCC/Pcell: add ARI field, offset ARI
  - When E-PDCCH schedules SCC/Scell
    - ACK/NACK transmission mode is PUCCH format 3: reuse TPC field, index ARI
    - ACK/NACK transmission mode is channel selection & cross-CC scheduling is configured: reuse TPC field, offset ARI
    - ACK/NACK transmission mode is channel selection & cross-CC scheduling is not configured: reuse TPC field, index ARI

METHOD FOR TRANSCEIVING CONTROL SIGNALS AND APPARATUS THEREFOR

CROSS-REFERENCE TO RELATED APPLICATIONS

This application is the National Stage filing under 35 U.S.C. 371 of International Application No. PCT/KR2013/004821, filed on May 31, 2013, which claims the benefit of U.S. Provisional Application Ser. No. 61/654,068, filed on May 31, 2012, 61/655,473, filed on Jun. 4, 2012, 61/657,006, filed on Jun. 7, 2012, 61/695,288, filed on Aug. 30, 2012, 61/727,062, filed on Nov. 15, 2012, 61/727,118, filed on Nov. 16, 2012, and 61/727,123, filed on Nov. 16, 2012, the contents of which are all hereby incorporated by reference herein in their entirety.

TECHNICAL FIELD

The present invention relates to a wireless communication system, and more particularly, to a method and apparatus for effectively allocating an ACK/NACK resource in a wireless communication system.

BACKGROUND ART

Wireless communication systems are widely developed to provide a various kinds of communication services such as audio or data service. In general, a wireless communication system is a multiple access system capable of supporting communications with multiple users by sharing available system resources (bandwidths, transmission power, etc.). Examples of the multiple access system include code division multiple access (CDMA) system, frequency division multiple access (FDMA) system, time division multiple access (TDMA) system, orthogonal frequency division multiple access (OFDMA) system, single carrier frequency division multiple access (SC-FDMA) system, multi-carrier frequency division multiple access (MC-FDMA) system, etc. In a wireless communication system, a user equipment (UE) can receive information from a base station (BS) in downlink (DL) and transmit information to the BS in uplink (UL). The information transmitted or received by the UE includes data and various control information and various physical channels are present according to the type and usage of the information transmitted or received by the UE.

DISCLOSURE

Technical Problem

An object of the present invention devised to solve the problem lies in a method and apparatus for effectively transmitting and receiving a control signal in a wireless communication system.

Another object of the present invention devised to solve the problem lies in a method and apparatus for effectively determining a resource for ACK/NACK signal transmission in a wireless communication system.

Another object of the present invention devised to solve the problem lies in a method and apparatus for preventing blocking of a resource for downlink (DL) grant in a wireless communication system.

Another object of the present invention devised to solve the problem lies in a method and apparatus for reducing ACK/NACK resource signaling overhead in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting an acknowledgement/negative acknowledgement (ACK/NACK) by a user equipment (UE) in a wireless communication system, the method including receiving downlink grant information through a physical downlink control channel, receiving downlink data through a physical downlink shared channel scheduled by downlink grant information, and transmitting an ACK/NACK signal for the downlink data using a plurality of ACK/NACK resources comprising a first ACK/NACK resource and a second ACK/NACK resource, wherein the physical downlink control channel is allocated to a data region of a subframe, and the first ACK/NACK resource and the second ACK/NACK resource are respectively determined as an uplink resource linked to a first resource index and an uplink resource linked to a second resource index among resource indexes constituting the physical downlink control channel and resource indexes included in the physical downlink shared channel.

The first resource index may be a lowest resource index of resource indexes constituting the physical downlink control channel, and the second resource index may be a lowest resource index of resource indexes included in the physical downlink shared channel.

The first resource index may be a lowest resource index of resource indexes included in the physical downlink shared channel, and the second resource index may be a second lowest resource index of resource indexes included in the physical downlink shared channel.

The first resource index may be a lowest resource index of resource indexes constituting the physical downlink control channel and resource indexes included in the physical downlink shared channel, and the second resource index may be a second lowest index of resource indexes constituting the physical downlink control channel and resource indexes included in the physical downlink shared channel.

When the number of resources constituting the physical downlink control channel is 2 or more, the first resource index may be a lowest resource index of resource indexes constituting the physical downlink control channel and the second resource index may be a second lowest resource index of resource indexes constituting the physical downlink control channel.

When a resource index included in the physical downlink shared channel is not present, the second resource index may be indicated via a higher layer.

The resource index may be a control channel element (CCE) index or a physical resource block (PRB) index.

In another aspect of the present invention, provided herein is a user equipment (UE) for transmitting an acknowledgement/negative acknowledgement (ACK/NACK) in a wireless communication system, wherein the UE comprises a radio frequency (RF) unit, and a processor, the processor is configured to receive downlink grant information through a physical downlink control channel, to receive downlink data through a physical downlink shared channel scheduled by downlink grant information, and to transmit an ACK/NACK signal for the downlink data using a plurality of ACK/NACK resources comprising a first ACK/NACK resource and a second ACK/NACK resource, the physical downlink control channel is allocated to a data region of a subframe, and the first ACK/NACK resource and the second ACK/NACK resource are respectively determined as an uplink resource linked to a first resource index and an uplink resource linked to a second resource index among resource indexes constituting the physical downlink control channel and resource indexes included in the physical downlink shared channel.

The first resource index may be a lowest resource index of resource indexes constituting the physical downlink control channel, and the second resource index may be a lowest resource index of resource indexes included in the physical downlink shared channel.

The first resource index may be a lowest resource index of resource indexes included in the physical downlink shared channel, and the second resource index may be a second lowest resource index of resource indexes included in the physical downlink shared channel.

The first resource index may be a lowest resource index of resource indexes constituting the physical downlink control channel and resource indexes included in the physical downlink shared channel, and the second resource index may be a second lowest index of resource indexes constituting the physical downlink control channel and resource indexes included in the physical downlink shared channel.

When the number of resources constituting the physical downlink control channel is 2 or more, the first resource index may be a lowest resource index of resource indexes constituting the physical downlink control channel and the second resource index may be a second lowest resource index of resource indexes constituting the physical downlink control channel.

When a resource index included in the physical downlink shared channel is not present, the second resource index may be indicated via a higher layer.

The resource index may be a control channel element (CCE) index or a physical resource block (PRB) index.

Advantageous Effects

According to the present invention, a control signal can be effectively transmitted and received in a wireless communication system.

According to the present invention, a resource for ACK/NACK signal transmission can be effectively determined in a wireless communication system.

According to the present invention, blocking of a resource for downlink (DL) grant can be prevented in a wireless communication system.

According to the present invention, ACK/NACK resource signaling overhead can be reduced in a wireless communication system.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 21 illustrates a method for determining two PUCCH resources according to the present invention, FIG. 22 illustrates an example for determining two PUCCH resources according to the present invention, FIG. 23 is a flowchart of a method for signaling ACK/NACK resource information according to the present invention.

BEST MODE

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16

(WiMAX), IEEE 802-20, and evolved UTRA (E-UTRA). UTRA is a part of universal mobile telecommunications system (UMTS). 3$^{rd}$ generation partnership project (3GPP) long term evolution (LTE) is a part of E-UMTS (Evolved UMTS), which uses E-UTRA. LTE-Advanced (LTE-A) is an evolved version of 3GPP LTE. Throughout this specification, the LTE system may be referred to as a system according to 3$^{rd}$ generation partnership project (3GPP) technical specification (TS) 36 8 (Release 8). In addition, in this specification, the LTE-A system may be referred to as a system according to 3GPP TS 36 series Release 9 and 10. The LTE(-A) system may be called to include the LTE system and the LTE-A system. For clarity, the following description focuses on 3GPP LTE(-A) system. However, technical features of the present invention are not limited thereto.

In a mobile communication system, a UE may receive information from a BS in downlink and transmit information in uplink. The information transmitted or received by the UE may be data and various control information. In addition, there are various physical channels according to the type or use of the information transmitted or received by the UE.

Figure 1:
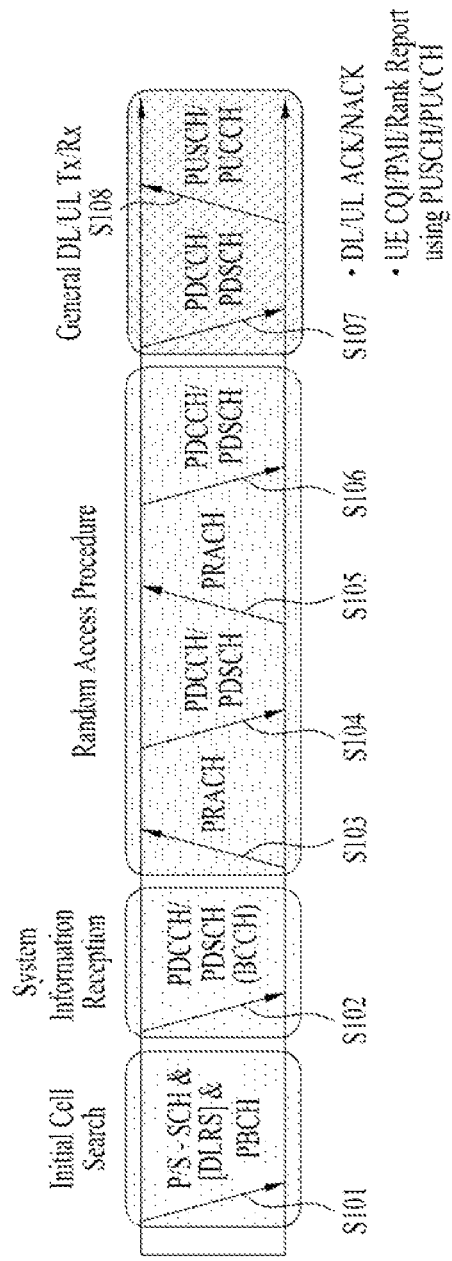
FIG. 1 illustrates physical channels and a general method for transmitting signals on the physical channels in the LTE (-A) system.

FIG. 1 illustrates physical channels and a general method for transmitting signals on the physical channels in the LTE(-A) system.

When a UE is powered on or enters a new cell, the UE performs initial cell search in step S101. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S102.

To complete access to the eNB, the UE may perform a random access procedure such as steps S103 to S106 with the eNB. To this end, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a physical uplink shared channel (PUSCH) and/or a physical uplink control channel (PUCCH) to the eNB (S108), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 2:
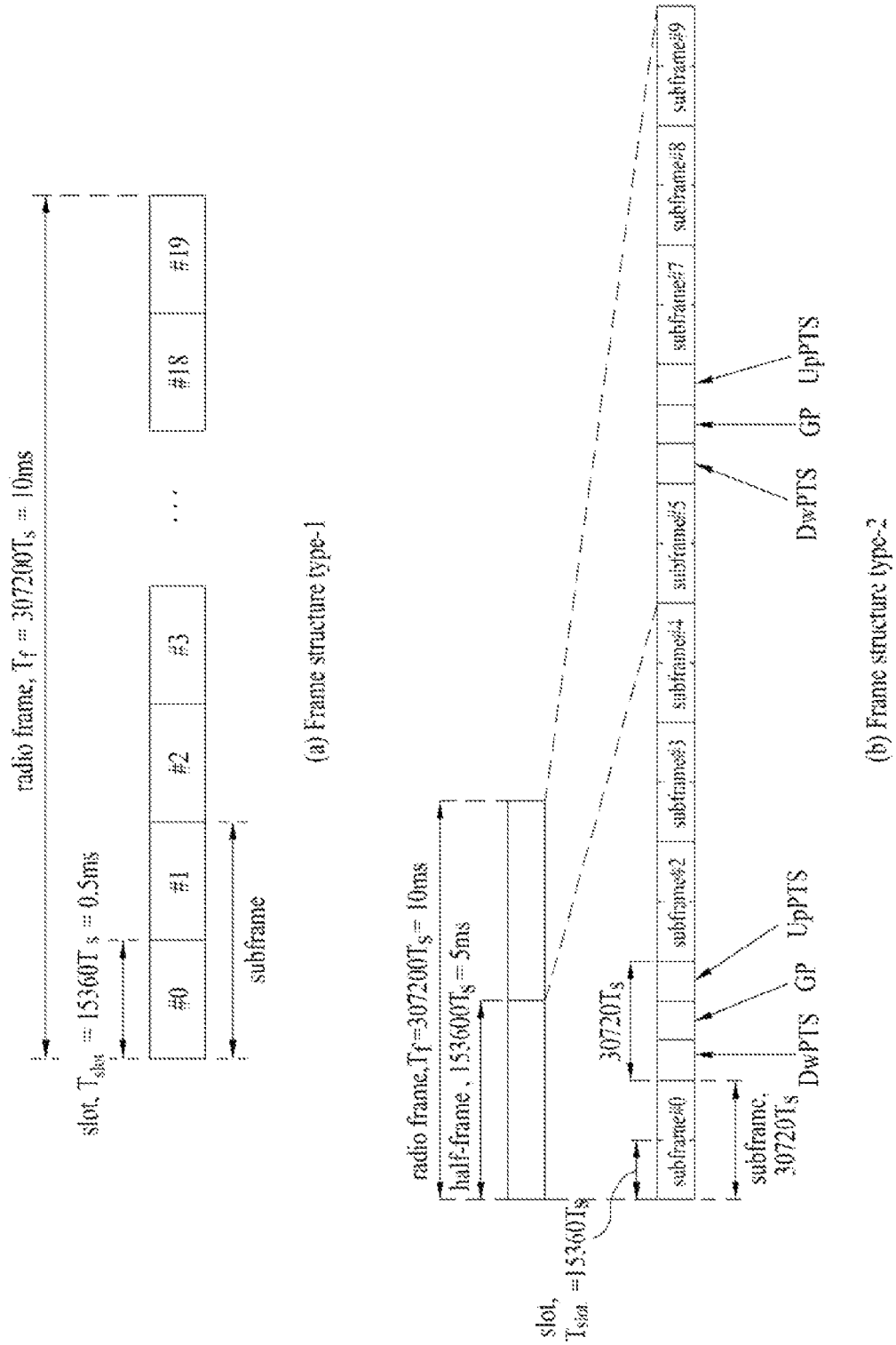
FIG. 2 illustrates a structure of a radio frame used in an LTE(-A) system.

FIG. 2 illustrates a structure of a radio frame used in an LTE(-A) system. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

The above-described radio frame structure is purely exemplary and thus the number of subframes in a radio frame, the number of slots in a subframe, or the number of symbols in a slot may vary in different ways.

Figure 3:
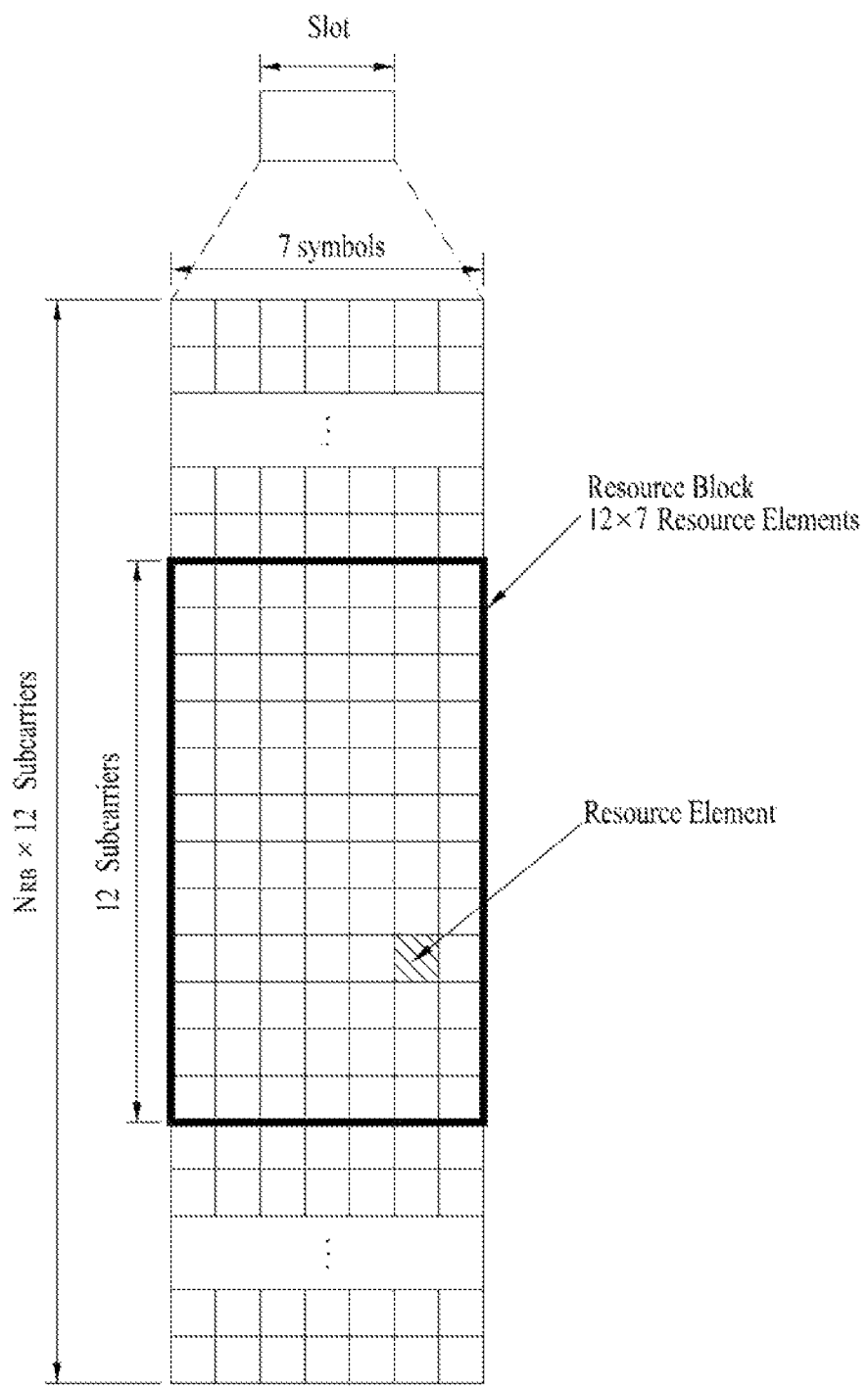
FIG. 3 illustrates a resource grid of one DL slot used in an LTE(-A) system.

FIG. 3 illustrates a resource grid of one DL slot used in an LTE(-A) system.

Referring to FIG. 3, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 4:
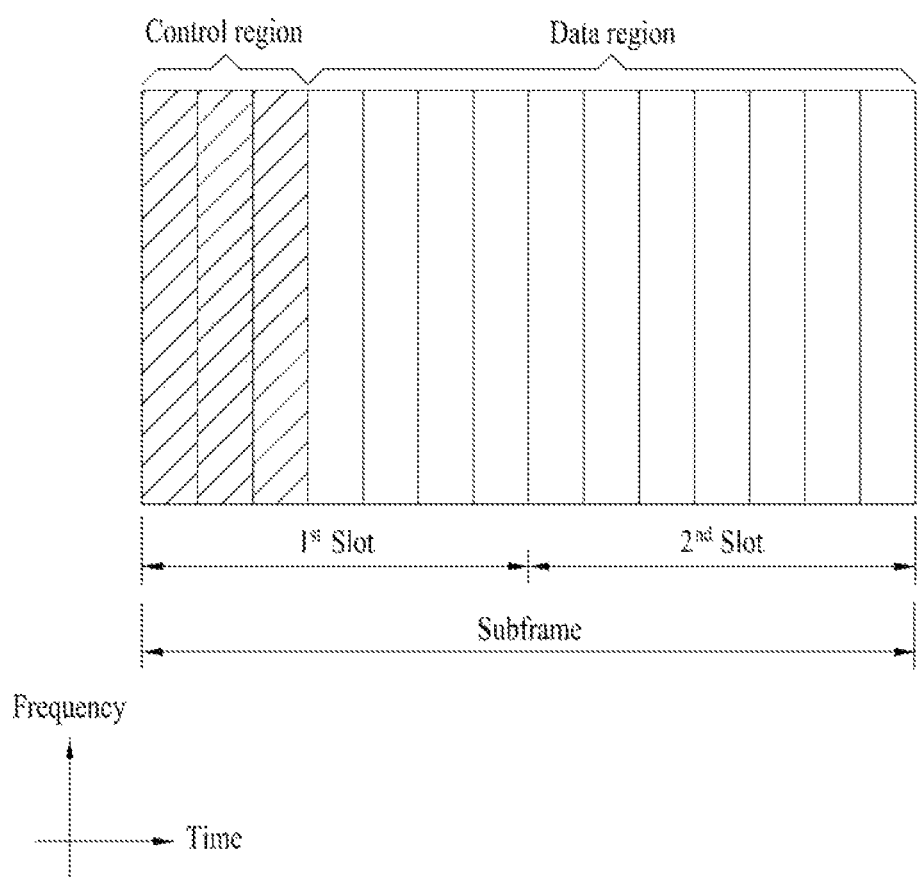
FIG. 4 illustrates a downlink subframe structure used in the LTE(-A) system.

FIG. 4 illustrates a downlink subframe structure used in the LTE(-A) system.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

Figure 5:
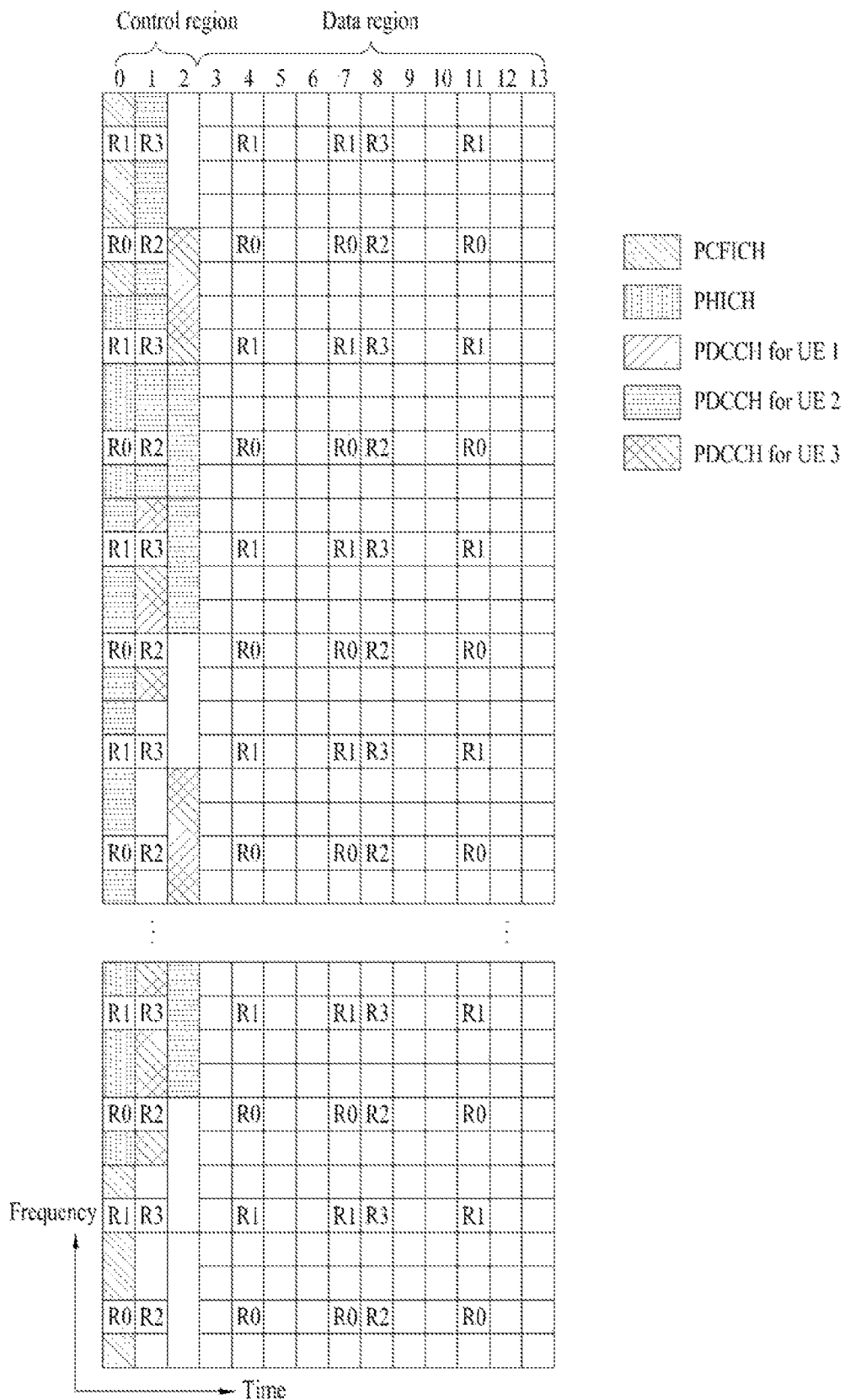
FIG. 5 illustrates a control channel allocated to a downlink subframe.

FIG. 5 illustrates a control channel allocated to a downlink subframe. In FIG. 5, R1 to R4 denote a cell-specific reference signal (CRS) or a cell-common reference signal for antenna ports 0 to 3. The CRS is transmitted in all bands every subframe and fixed in a predetermined pattern in a subframe. The CRS is used to channel measurement and downlink signal demodulation.

Referring to FIG. 5, the PCFICH is transmitted at a first OFDM symbol of a subframe and carries information regarding the number of OFDM symbols used for transmission of control channels within the subframe. The PCFICH is composed of four REGs that are uniformly distributed in a control region based on a cell ID. The PCFICH indicates a value of 1 to 3 (or 2 to 4) and is modulated via quadrature phase shift keying (QPSK). The PHICH is a response of uplink transmission and carries an HARQ acknowledgment (ACK)/not-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI)

request, HARQ process number, transmitted precoding matrix indicator (TPMI), precoding matrix indicator (PMI) confirmation, etc. according to its usage.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted in one subframe. Each PDCCH is transmitted using one or more control channel elements (CCEs) and each CCE corresponds to nine sets of four resource elements. The four resource elements are referred to as a resource element group (REG). Four QPSK symbols are mapped to one REG. A resource element allocated to a reference signal is not included in an REG and thus a total number of REGs in a given OFDM symbol varies according to whether a cell-specific reference signal is present.

Table 3 shows the number of CCEs, the number of REGs, and the number of PDCCH bits according to PDCCH format.

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is demasked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Table 4 shows sizes of CSS and USS.

TABLE 4

| PDCCH format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO Transmission Mode 6: Closed-loop rank-1 precoding Transmission Mode 7: Single-antenna port (port 5) transmission Transmission Mode 8: Dual layer transmission (ports 7 and 8) or single-antenna port (port 7 or 8) transmission Transmission Modes 9 and 10: Layer transmission up to rank 8 (ports 7 to 14) or single-antenna port (port 7 or 8) transmission DCI format Format 0: Resource grant for PUSCH transmission (uplink)

Format 1: Resource allocation for single codeword PUSCH transmission (transmission modes 1, 2, and 7)

Format 1A: Compact signaling of resource allocation for single codeword PDSCH transmission (all modes)

Format 1B: Compact resource allocation for PDSCH (mode 6) using rank-1 closed-loop precoding Format 1C: Very compact resource allocation for PDSCH (e.g., paging/broadcast system information)

Format 1D: Compact resource allocation for PDSCH (mode 5) using multi-user MIMO

Format 2: Resource allocation for PDSCH (mode 4) of closed-loop MIMO operation

Format 2A: Resource allocation for PDSCH (mode 3) of open-loop MIMO operation

Format 3/3A: Power control command with 2-bit/1-bit power adjustments for PUCCH and PUSCH Format 4: Resource grant for PUSCH transmission (uplink) in a cell configured in a multi-antenna port transmission mode A UE may be semi-statically configured via higher layer signaling for reception of PDSCH data transmission that is scheduled through the PDCCH according to ten transmission modes. Table 5 below shows a transmission mode signaled via a higher layer and configurable DCI format when a UE detects a scrambled PDCCH as a C-RNTI identifier.

Figure 6:
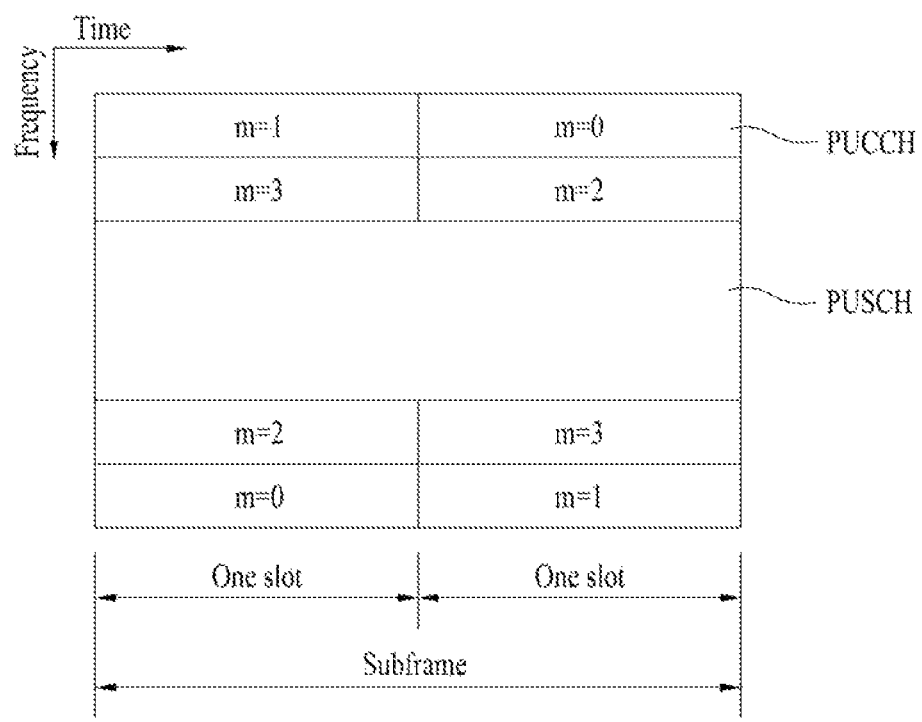
FIG. 6 illustrates a structure of a UL subframe in the LTE(-A) system.

FIG. 6 illustrates a structure of a UL subframe in the LTE(-A) system.

Referring to FIG. 6, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region on a frequency axis and the RB pair frequency-hops over a slot boundary.

The PUCCH may deliver the following control information.

Scheduling request (SR): information requesting UL-SCH resources. An SR is transmitted in On-Off Keying (OOK).

HARQ ACK/NACK: a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.

CSI: feedback information regarding a DL channel. CSI includes a CQI and Multiple Input Multiple Output (MIMO)-related feedback information includes an RI, a PMI, a Precoding Type Indicator (PTI), etc. The CSI occupies 20 bits per subframe.

Table 5 below illustrates a mapping relationship between PUCCH formats and UCI in the LTE system.

TABLE 5

| PUCCH format | Uplink Control Information, UCI |
|---|---|
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1/2-bit HARQ ACK/NACK (20 bits)(Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Meanwhile, in the LTE system, since the UE cannot simultaneously transmit a PUCCH and a PUSCH, when UCI (e.g., CQI/PMI, HARQ-ACK, RI, etc.) needs to be transmitted in a subframe in which a PUSCH is transmitted, UCI is multiplexed in a PUSCH region. Multiplexing of UCI in a PUSCH region may be referred to as PUSCH piggyback. In the LTE-A system, the UE may also be configured not to simultaneously transmit a PUCCH and a PUSCH. In this case, when UCI (e.g., CQI/PMI, HARQ-ACK, RI, etc.) needs to be transmitted in a subframe in which a PUSCH is transmitted, the UE may multiplex UCI in a PUSCH region (PUSCH piggyback).

Figure 7:
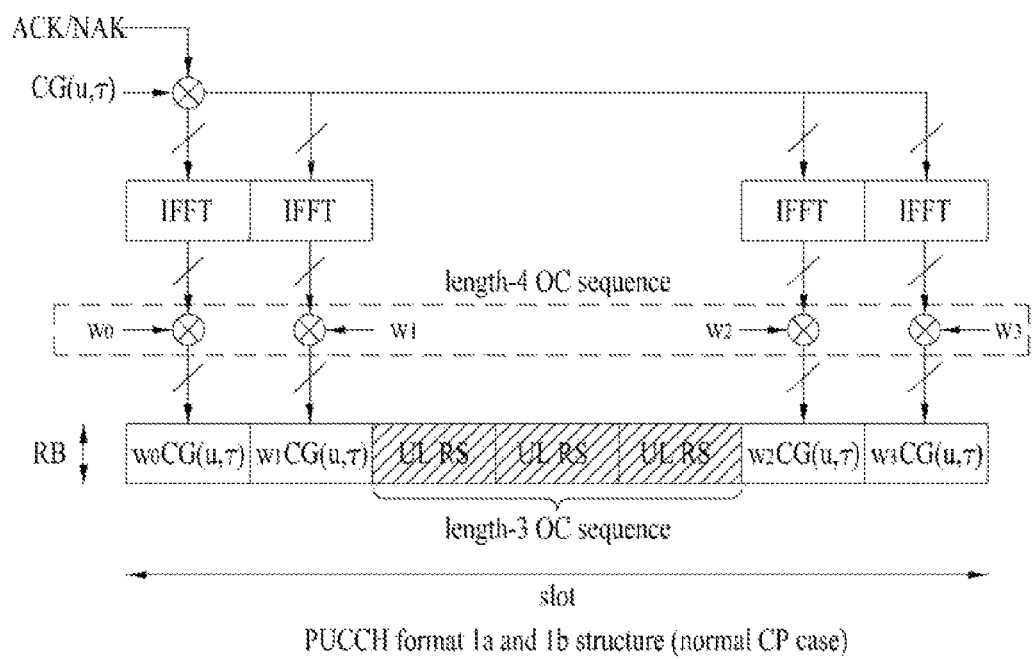
FIGS. 7 and 8 show a slot level structure of PUCCH format 1a/1b.
Figure 8:
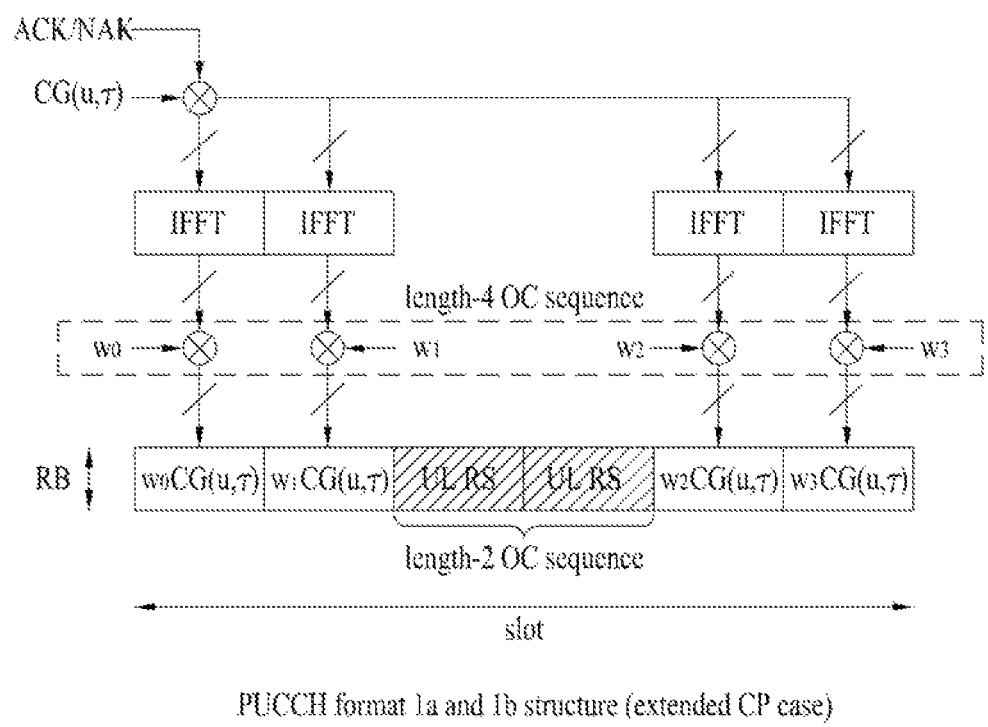

FIGS. 7 and 8 show a slot level structure of PUCCH format 1a/1b. FIG. 7 shows the case of normal CP and FIG. 8 shows the case of extended CP. The PUCCH format 1a/1b is used for ACK/NACK transmission. In the case of normal CP, SC-FDMA symbols #2, #3, and #4 are used for DM RS transmissions. In the case of extended CP, SC-FDMA symbols #2 and #3 are used for DM RS transmission. Accordingly, four SC-FDMA symbols are used for ACK/NACK transmission in one slot. Throughout this specification, the PUCCH format 1a/1b is referred to as PUCCH format 1 unless clearly specified otherwise in context.

Referring to FIGS. 7 and 8, one ACK/NACK information bit [b(o)] and two ACK/NACK information bits [(b0)b(1)] are modulated using binary phase shift keying (BPSK) and quadrature phase shift keying (QPSK) modulation respectively, resulting in a single ACK/NACK modulation symbol (d0). Each bit [b(i), i=0, 1] in the ACK/NACK information represents a HARQ-ACK response to a corresponding DL transmission block (or codeword). A positive ACK (ACK) is encoded as a binary '1' and a negative ACK (NAKC) as a binary '0'. Table 6 shows a modulation table defined for the PUCCH formats 1a and 1b in legacy LTE/LTE-A.

In PUCCH format 1, control information having the same content is repeated in slot units in a subframe. In each UE, an ACK/NACK signal is transmitted through different resources configured with different cyclic shift (CS) (frequency domain code) of a computer-generated constant amplitude zero auto correlation (CG-CAZAC) sequence and an orthogonal cover or orthogonal cover code (OC or OCC) (time domain spreading code). The OC includes, for example, Walsh)/DFT orthogonal code. When the number of CSs is 6 and the number of OCs is 3, a total of 18 UEs may be multiplexed on the same PRB based on a single antenna. Orthogonal sequences w0, w1, w2, and w3 (after FFT modulation) may be applied in a random time domain or a random frequency domain (before FFT modulation).

RSs transmitted from different UEs are multiplexed in the same way as UCI. The number of cyclic shifts supported in an SC-FDMA symbol for PUCCH ACK/NACK RBs is configurable by a cell-specific higher-layer signaling parameter. $\epsilon\{1, 2, 3\}$ indicates 12, 6, or 4 shifts respectively. For the time-domain CDM, the number of spreading codes for ACK/NACK data is limited by the number of RS symbols, as the multiplexing capacity of RS symbols is smaller than that of USI symbols due to smaller number of RS symbols.

Figure 9:
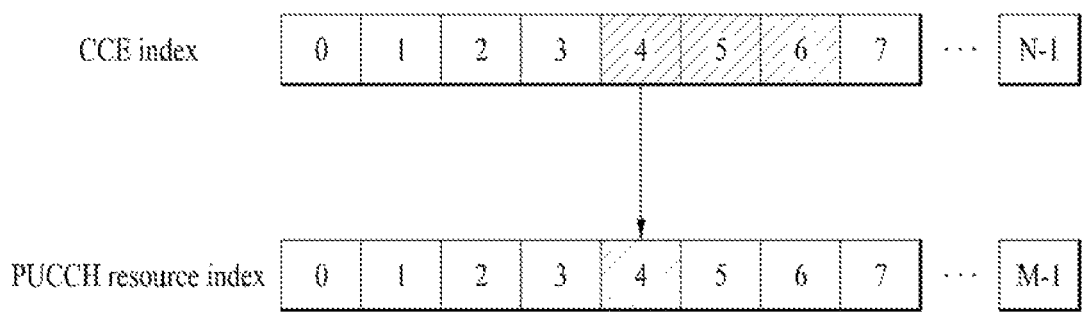
FIG. 9 shows an example of determining PUCCH resources for ACK/NACK.

FIG. 9 shows an example of determining PUCCH resources for ACK/NACK. A PUCCH resource for ACK/NACK information is not allocated to each UE in the cell in advance in the LTE system, and a plurality of UEs in the cell share a plurality of PUCCH resources at each point of time. Specifically, a PUCCH resource that a UE uses to transmit the ACK/NACK corresponds to a PDCCH that carries scheduling information regarding corresponding downlink data. In detail, a PDCCH transmitted to the UE in a downlink subframe is configured with one or more control channel elements (CCEs) and ACK/NACK may be transmitted through a PUCCH resource corresponding to a specific CCE (e.g., first CCE) among the CCEs constructing the corresponding PDCCH.

Referring to FIG. 9, each square of a DL Component Carrier (CC) represents a CCE and each square of a UL CC represents a PUCCH resource. Each PUCCH index indicates a PUCCH resource for an ACK/NACK. If information about a PDSCH is delivered on a PDCCH including CCEs 4, 5, and 6 as illustrated in FIG. 8, the UE transmits an ACK/NACK in PUCCH 4 mapped to CCE 4 which is the first of the CCEs of the PDCCH. FIG. 9 illustrates an exemplary case in which there are up to M PUCCHs in a UL CC, for a DL CC having up to N CCEs. While N may be equal to M, N and M may be different and thus the CCEs may be mapped to the PUCCHs in an overlapped manner.

Specifically, PUCCH resource indexes are determined by the following equation in the LTE system.

$$n_{PUCCH}^{(1)} = n_{CCE} + N_{PUCCH}^{(1)} \quad \text{[Equation 1]}$$

Here, $n^{(1)}_{PUCCH}$ is a resource index in PUCCH format 1, for transmission of ACK/NACK/DTX, $N^1_{PUCCH}$ is a value signaled via higher-layer signaling, and $n_{CCE}$ is the lowest index of CCE indexes used for PDCCH transmission. A cyclic shift, an orthogonal cover code (or a orthogonal spreading code), and a physical resource block (PRB) for PUCCH format 1 are acquired from $n^{(1)}_{PUCCH}$.

Figure 10:
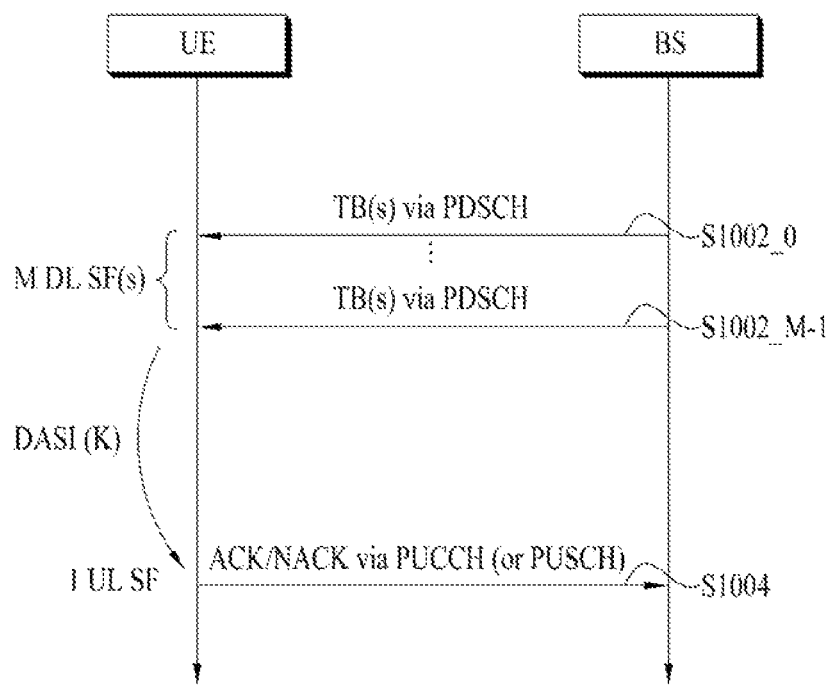
FIG. 10 is a diagram illustrating a transmitting procedure of TDD UL ACK/NACK in a single cell situation.

FIG. 10 is a diagram illustrating a transmitting procedure of TDD UL ACK/NACK in a single cell situation.

Referring to FIG. 10, a UE may receive one or more DL transmissions (e.g., PDSCH signal) on M DL subframes (SFs) (S1002_0 to S1002_M−1). Each PDSCH signal I used to transmit one or more (e.g., 2) transport blocks (TBs) (or a codeword (CW)) according to a transmission mode. Although not illustrated in FIG. 10, in steps S1002_0 to S1002_M−1, a PDCCH signal that requires an ACK/NACK response, for example, a PDCCH signal (simply, SPS release PDCCH signal) indicating SPS release may also be received. When a PDSCH signal and/or an SPS release PDCCH signal are present in M DL subframes, the UE transmits ACK/NACK through one UL subframe corresponding M DL subframes via a procedure (e.g., ACK/NACK (payload) generation, ACK/NACK resource allocation, etc.) for transmitting ACK/NACK (S1004). ACK/NACK includes reception response information for a PDSCH signal and/or an SPS release PDCCH signal of steps S1002_0 to S1002_M−1. Although ACK/NACK can be basically transmitted through a PUCCH (e.g., refer to FIGS. 7 and 8), when PUSCH is transmitted at a point of time of ACK/NACK transmission, the ACK/NACK may be transmitted through a PUSCH. Various PUCCH formats of Table 3 may be used for ACK/NACK transmission. In addition, in order to reduce the number of transmitted ACK/NACK bits, various methods such as ACK/NACK bundling, ACK/NACK channel selection, etc. may be used.

As described above, in TDD, ACK/NACK for data received in M DL subframes is transmitted through one UL subframe (i.e., M DL SF(s):1 UL SF), a relation thereof is given by a downlink association set index (DASI).

Table 6 below shows DASI (K: {k0, k1, . . . kM−1}) defined in LTE(-A). Table 6 shows an interval with a DL subframe associated with a UL subframe in which ACK/NACK is transmitted in terms of the UL subframe. In detail, when PDSCH transmission and/or SPS release PDCCH are present in a subframe n−k (k∈K), a UE transmits ACK/NACK corresponding to a subframe n.

TABLE 6

| UL-DL Configuration | Subframe n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

During an operation using a TDD method, a UE needs to transmit an ACK/NACK signal for one or more DL transmissions (e.g., PDSCH) received through M DL SFs through one UL SF. ACK/NACK for a plurality of DL SFs is transmitted through one UL SF using the following method.

1) ACK/NACK bundling: ACK/NACK bits for a plurality of data units (e.g., PDSCH, SPS release PDCCH, etc.) are combined via logical operation (e.g., logical-AND operation). For example, when all data units are successfully decoded, a receiver (e.g., UE) transmits an ACK signal. On the other hand, when decoding (or detecting) of even one data unit fails, the receiver may or may not transmit a NACK signal.

2) Channel selection: A UE that receives a plurality of data units (e.g., PDSCH, SPS release PDCCH, etc.) occupies a plurality of PUCCH resources for ACK/NACK transmission. An ACK/NACK response for a plurality of data units is identified by a combination of a PUCCH resource used for actual ACK/NACK transmission and transmitted ACK/NACK content (e.g., a bit value and a QPSK symbol value). The channel selection method may also be referred to as an ACK/NACK selection method or a PUCCH selection method.

In TDD, upon transmitting an ACK/NACK signal to an eNB, a UE may miss some of PDCCH(s) transmitted by the eNB for a plurality of subframe periods. In this case, the UE cannot know that a PDSCH corresponding to the missed PDCCH is transmitted to the UE, and thus errors may occur during ACK/NACK generation.

To overcome these errors, a TDD system adds a downlink assignment index (DAI) to a PDCCH. The DAI denotes accumulated values (i.e., a counting value) of PDCCH(s) corresponding to PDSCH(s) to a current subframe in DL subframe(s) n−k (k∊K) and PDCCH(s) indicating DL SPS release. For example, when three DL subframes correspond to one UL subframe, indexes are sequentially applied (i.e., sequentially counted) to a PDSCH transmitted in three DL subframe periods to carry a PDCCH for scheduling a PDSCH. The UE may recognize whether a PDCCH has been appropriately received so far from the DAI information in the PDCCH. For convenience, DAI included in PDSCH-scheduling PDCCH and SPS release PDCCH is referred to as DL DAI or DAI-counter (DAI-c) or is simply referred to as DAI.

Table 7 below shows a value $V^{DL}_{DAI}$ indicated by a DL DAI field. In this specification, DL DAI may be simply denoted by V. MSB indicates a most significant bit and LSB indicates a least significant bit.

TABLE 7

| DAI MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Figure 11:
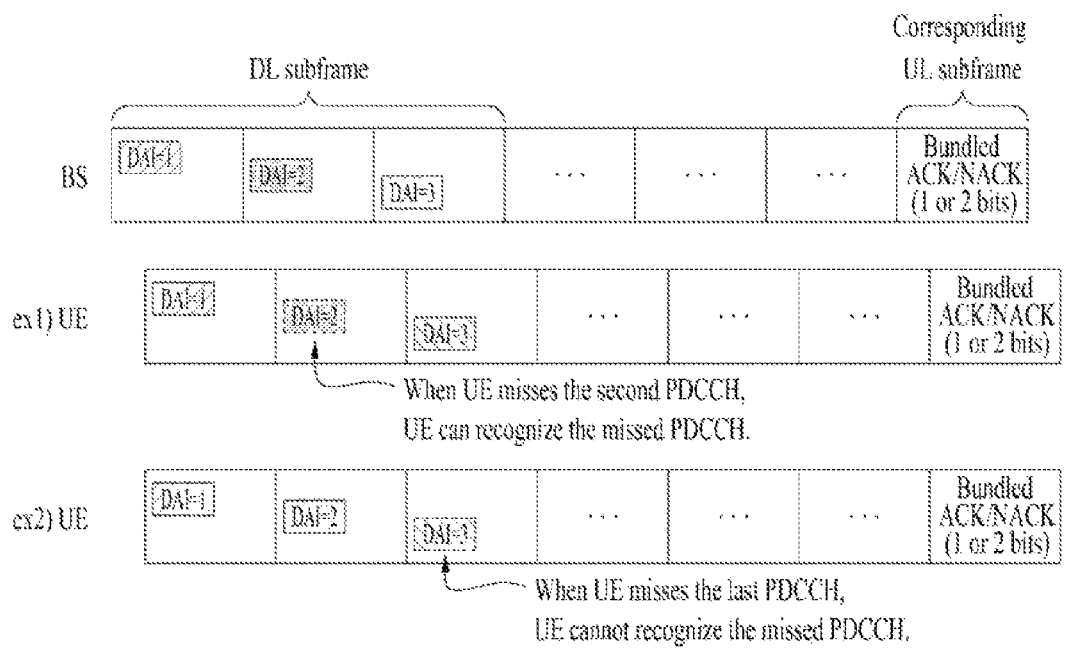
FIG. 11 illustrates an example of ACK/NACK transmission using DL DAI.

FIG. 11 illustrates an example of ACK/NACK transmission using DL DAI. This example assumes a TDD system configured with three DL subframes: one UL subframe. For convenience, it is assumed that a UE transmits ACK/NACK using a PUSCH resource. In the legacy LTE, when ACK/NACK is transmitted through a PUSCH, 1-bit or 2-bit bundled ACK/NACK is transmitted.

Referring to FIG. 11, like in the first example, when a second PDCCH is missed, a value of DL DAI of a third PDCCH is different from the number of PDCCHs that have been detected so far, and thus a UE may recognize that a second PDCCH is missed. In this case, a UE may process an ACK/NACK response for a second PDCCH as NACK (or NACK/DTX). On the other hand, like in the second example, when a last PDCCH is missed, a value of DL DAI of a lastly detected PDCCH is the same as the number of PDCCHs that have been detected so far, and thus the UE may not recognize that the last PDCCH is missed (i.e., DTX). Accordingly, the UE recognizes that only two PDCCHs are scheduled for a DL subframe period. In this case, the UE bundles only ACK/NACK corresponding to first two PDCCHs, and thus errors occur in an ACK/NACK feedback procedure. To overcome this problem, PUSCH-scheduling PDCCH (i.e., UL grant PDCCH) includes a DAI field (for convenience, a UL DAI field). The UL DAI field is a 2-bit field and the UL DAI field indicates information about the number of scheduled PDCCHs.

In detail, when $V^{UL}_{DAI} \neq (U_{DAI}+N_{SPS}-1) \bmod 4+1$, the UE assumes that at least one DL allocation is lost (i.e., DTX generation) and generates NACK for all code words according to a bundling procedure. Here, $U_{DAI}$ indicates a total number of SPS release PDCCH and DL grant PDCCHs detected in a subframe n−k (k∊K) (refer to Table 6). $N_{SPS}$ denotes the number of SPS PDSCHs and is 0 or 1.

Table 8 below shows a value $V^{UL}_{DAI}$ indicated by a UL DAI field. In this specification, UL DAI may be simply denoted by W. MSB indicates a most significant bit and LSB indicates a least significant bit.

TABLE 8

| DAI MSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Figure 12:
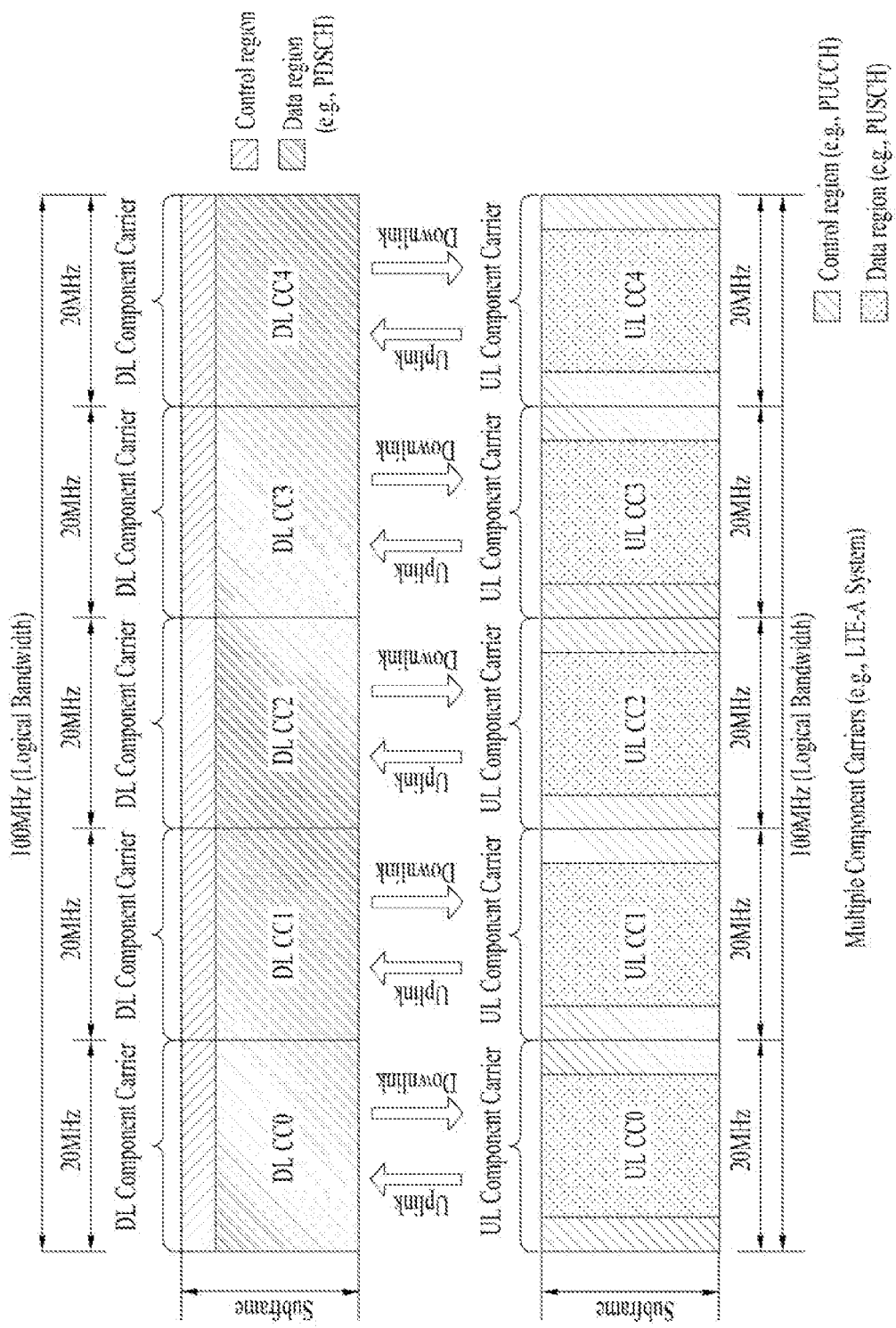
FIG. 12 illustrates a carrier aggregation (CA) communication system.

FIG. 12 illustrates a carrier aggregation (CA) communication system. An LTE-A system uses carrier aggregation or bandwidth aggregation technologies using a greater UL/DL bandwidth by collecting a plurality of UL/DL frequency blocks in order to use wider frequency band. Each frequency block is transmitted using a component carrier (CC). A CC may be understood as a carrier frequency (a center carrier or a center frequency) for a corresponding frequency block.

Referring to FIG. 12, a plurality of UL/DL CCs may be collected to support a wider UL/DL bandwidth. The CCs may or may not be adjacent to each other in the frequency domain. Bandwidths of CCs may be independently determined Asymmetric carrier aggregation in which the number of UL CCs and the number of DL CCs are different may be possible. For example, in the case of two DL CCs and one UL CC, asymmetric carrier aggregation may be configured with 2:1. A DL CC/UL CC link may be fixed to a system and may be semi-statically configured. In addition, even if an entire band of a system is configured by N CCs, a frequency band for monitoring/receiving of a specific UE may be limited to M(<N) CCs. Various parameters for carrier aggregation may be configured cell-specifically, UE group-specifically, or UE-specifically. Control information may be configured to be transmitted and received through only a specific CC. The specific CC may be referred to as a primary CC (PCC) (or anchor CC) and the remaining CC may be referred to as a secondary CC (SCC).

The LTE(-A) system adopts the concept of cell to manage radio resources. A cell is defined as a combination of DL and UL resources, while the UL resources are optional. Accordingly, a cell may include DL resources only or both DL and UL resources. If CA is supported, the linkage between the carrier frequencies (or DL CCs) of DL resources and the carrier frequencies (or UL CCs) of UL resources may be indicated by system information. A cell operating in a primary frequency resource (or a PCC) may be referred to as a PCell and a cell operating in a secondary frequency resource (an SCC) may be referred to as an SCell. The PCell is used for a UE to establish an initial connection or to re-establish a connection. The PCell may be a cell indicated during handover. The SCell may be configured after an RRC connection is established and used to provide additional radio resources. Both a PCell and an SCell may be collectively referred to as serving cells. Accordingly, if CA has not been configured for a UE in RRC_CONNECTED state or the UE in RRC_CONNECTED state does not support CA, one serving cell including only a PCell exists for the UE. On the other hand, if CA has been configured for a UE in RRC_CONNECTED state, one or more serving cells including a PCell and one or more SCells exist for the UE. For CA, a network may add one or more SCells to a PCell initially configured during connection establishment, for a UE after initial security activation is initiated.

The LTE-A system may support aggregation of a plurality of CCs (i.e., carrier aggregation) and consider a method for transmitting ACK/NACK for a plurality of DL data (e.g., data transmitted through a PDSCH) transmitted through a plurality of CCs through only one specific CC (e.g., PCC). As described above, a CC except for a PCC may be referred to as an SCC and ACK/NACK for DL data may be referred to as "A/N". In addition, the LTE-A system may support cross CC scheduling during carrier aggregation. In this case, one CC (e.g., scheduled CC) may be pre-configured so as to be DL/UL scheduled through one specific CC (e.g., scheduling CC) (i.e., so as to receive DL/UL grant PDCCH for corresponding scheduled CC). Cross CC scheduling (in terms of a UE) may be an appropriate operation when a control channel region of an SCC is not appropriate for PDCCH transmission due to interference influence, a channel state, etc.

If cross-carrier scheduling (or cross-CC scheduling) is used, a DL assignment PDCCH may be transmitted in DL CC #0 and a PDSCH associated with the PDCCH may be transmitted in DL CC #2. For cross-CC scheduling, a Carrier Indicator Field (CIF) may be introduced. The existence or absence of a CIF in a PDCCH may be determined semi-statically and UE-specifically (or UE group-specifically) by higher-layer signaling (e.g. RRC signaling). The baseline of PDCCH transmission is summarized as follows.

CIF disabled: a PDCCH in a DL CC allocates PDSCH resources of the same DL CC or PUSCH resources of one linked UL CC.

CIF enabled: a PDCCH in a DL CC may allocate PDSCH resources or PUSCH resources of a specific DL/UL CC from among a plurality of aggregated DL/UL CCs using a CIF.

In the presence of a CIF, an eNB may allocate a PDCCH monitoring DL CC set to a UE in order to reduce blind decoding complexity of the UE. The PDCCH monitoring CC set is a part of total aggregated DL CCs, including one or more DL CCs. The UE detects/decodes a PDCCH only in the DL CCs of the PDCCH monitoring DL CC set. The PDCCH monitoring DL CC set may be configured UE-specifically, UE group-specifically, or cell-specifically. The term "PDCCH monitoring DL CC" may be replaced with an equivalent term such as monitoring carrier, monitoring cell, etc. In addition, the term CCs aggregated for a UE may be interchangeably used with an equivalent term such as serving CCs, serving carriers, serving cells, etc.

Figure 13:
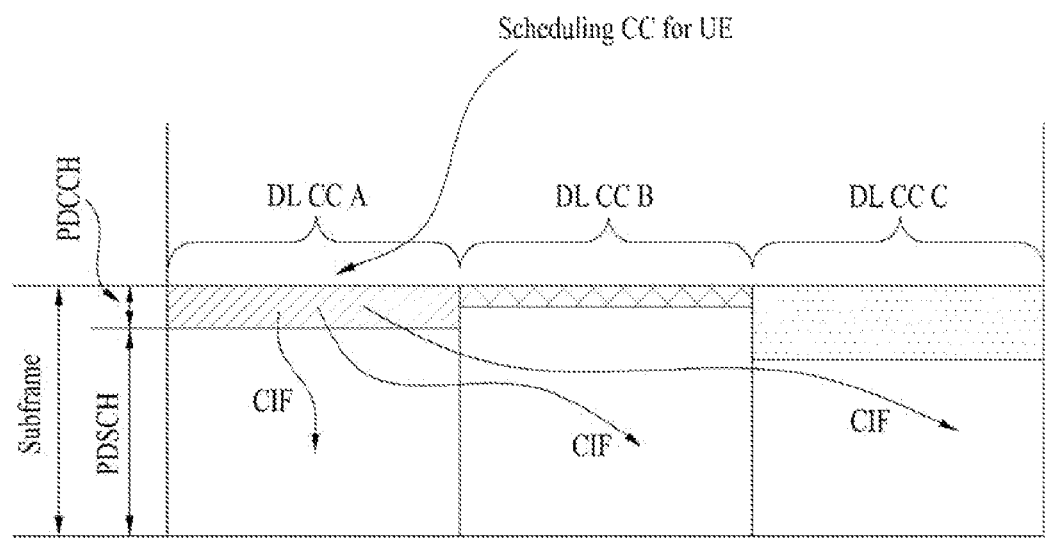
FIG. 13 illustrates an exemplary scheduling, when a plurality of carriers are aggregated.

FIG. 13 illustrates an exemplary scheduling, when a plurality of carriers are aggregated. It is assumed that three DL CCs are aggregated and DL CC A is set as a PDCCH monitoring DL CC. DL CCs A, B, and C may be referred to as serving CCs, serving carriers, serving cells, etc. If a CIF is disabled, each DL CC may deliver only a PDCCH that schedules a PDSCH in the DL CC, without a CIF according to an LTE PDCCH rule. On the other hand, if a CIF is enabled by UE-specific (UE group-specific or cell-specific) higher-layer signaling, DL CC A (i.e. the monitoring CC) may deliver a PDCCH that schedules a PDSCH of another CC as well as a PDCCH that schedules a PDSCH of DL CC A, using the CIF. In this case, no PDCCH is transmitted in DL CCs B and C that are not set as PDCCH monitoring DL CCs.

The LTE-A system considers transmission of a plurality of pieces of ACK/NACK information/a plurality of ACK/NACK signals in a specific UL CC, for a plurality of PDSCHs transmitted in a plurality of DL CCs. For this purpose, unlike ACK/NACK transmission using PUCCH format 1a/1b in the legacy LTE, the plurality of ACK/NACK signals may be jointly encoded (e.g. using a reed-Muller code, a tail-biting convolutional code, etc.) and then the jointly encoded ACK/NACK information/signal may be transmitted in PUCCH format 2 or a new PUCCH format (referred to as PUCCH format 3). PUCCH format 3 includes the following block spreading-based PUCCH format. For example, PUCCH format 3 may be used in transmitting an ACK/NACK, CSI (e.g. a CQI, a PMI, an RI, a PTI, etc.), and an SR alone or in combination.

Figure 14:
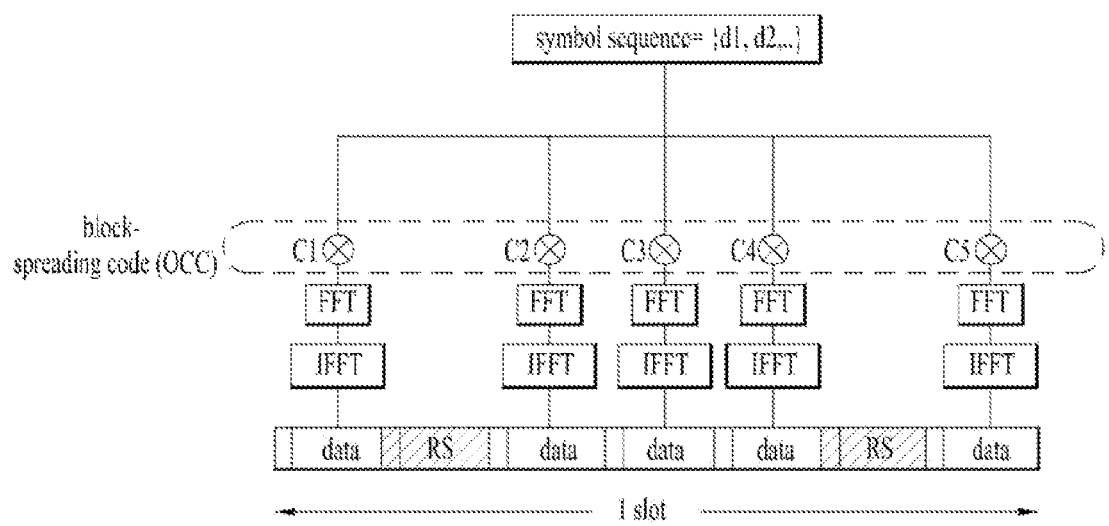
FIG. 14 illustrates exemplary PUCCH format 3 at a slot level.

FIG. 14 illustrates exemplary PUCCH format 3 at a slot level. In PUCCH format 3, one symbol sequence is transmitted in the frequency domain and UEs are multiplexed using by time-domain spreading using Orthogonal Cover Codes (OCCs). That is, the symbol sequence is spread with an OCC in the time domain. Control signals of a plurality of UEs may be multiplexed into the same RB using OCCs.

Referring to FIG. 14, five SC-FDMA symbols (i.e. a UCI data part) are generated from one symbol sequence {d1, d2, . . . } using a length-5 OCC with spreading factor (SF)=5, C1 to C5. The symbol sequence {d1, d2, . . . } may be a modulation symbol sequence or a codeword bit sequence. If the symbol sequence {d1, d2, . . . } is a codeword bit sequence, a modulation block is further included in the block diagram of FIG. 14. While two RS symbols (i.e. an RS part) are transmitted in one slot in FIG. 14, many other applications may be contemplated, including using an RS part with three RS symbols and a UCI data part configured with an OCC with SF=4. The RS symbols may be generated by cyclically shifting a CAZAC sequence by a predetermined CS value. In addition, a plurality of time-domain RS symbols may be multiplied by a specific OSS and then transmitted. Block-spread UCI is transmitted to a network after it is subject to Fast Fourier Transform (FFT) and Inverse Fast Fourier Transform (IFFT) on an SC-FDMA symbol basis. That is, the block-spreading scheme modulates the control information (e.g. an ACK/NACK, etc.) in SC-FDMA, as compared to the legacy PUCCH format 1 or 2 series.

Figure 15:
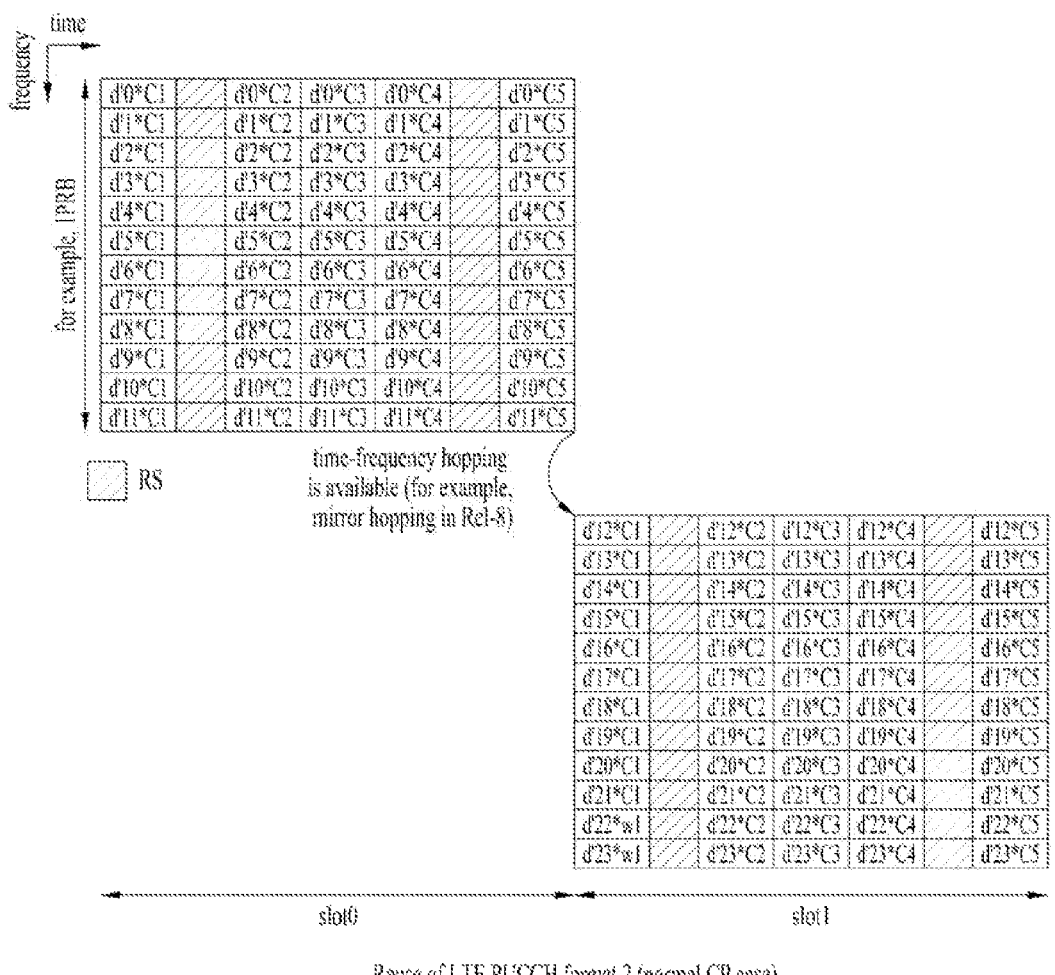
FIG. 15 illustrates exemplary PUCCH format 3 at a subframe level.

FIG. 15 illustrates exemplary PUCCH format 3 at a subframe level.

Referring to FIG. 15, a symbol sequence {d'0 to d'11} is mapped to subcarriers of an SC-FDMA symbol and mapped to five SC-FDMA symbols by block spreading using an OCC C1 to C5 in slot 0. Similarly, a symbol sequence {d'12 to d'23} is mapped to subcarriers of an SC-FDMA symbol and mapped to five SC-FDMA symbols by block spreading using the OCC C1 to C5 in slot 1. The symbol sequence of each slot, {d'0 to d'11} or {d'12 to d'23} is obtained by FFT-processing or FFT/IFFT-processing the symbol sequence {d1, d2, . . . } illustrated in FIG. 15. If the symbol sequence {d'0 to d'11} or {d'0 to d'23} results from FFT-processing of the symbol sequence {d1, d2, . . . } illustrated in FIG. 15, the symbol sequence {d'0 to d'11} or {d'12 to d'23} is additionally IFFT-processed to generate SC-FDMA symbols. The total symbol sequence {d'0 to d'23} is generated by jointly encoding one or more pieces of UCI. The former half of the symbol sequence {d'0 to d'23} is transmitted in slot 0 and the latter half of the symbol sequence {d'0 to d'23} is transmitted in slot 1. While not shown, different OCCs may be used in different slots and UCI data may be scrambled on an SC-FDMA symbol basis.

A resource for PUCCH format 3 may be explicitly given. In detail, a PUCCH resource set may be configured by a higher layer (e.g., RRC) and a PUCCH resource to be actually used may be indicated using an ACK/NACK resource indicator (ARI) value of a PDCCH.

Table. 9 shows an example in which a PUCCH resource for HARQ-ACK is explicitly indicated.

TABLE 9

| HARG-ACK resource indicator (ARI) for PUCCH | $n_{PUCCH}$ |
| --- | --- |
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

In Table 9 above, a higher layer includes an RRC layer and an ARI value may be indicated through a PDCCH for carrying DL grant. For example, the ARI value may be indicated using a transmit power control (TPC) field of a SCell PDCCH and/or a PCell PDCCH that does not correspond to an initial value of DAI.

Figure 16:
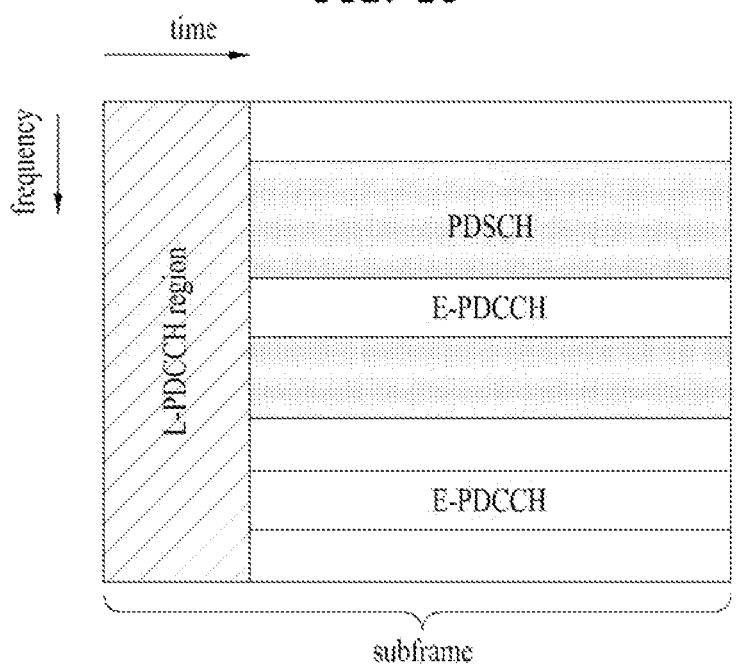
FIG. 16 is a diagram illustrating an example in which a DL physical channel is allocated to a subframe.

FIG. 16 is a diagram illustrating an example in which a DL physical channel is allocated to a subframe.

Referring to FIG. 16, a PDCCH (for convenience, legacy PDCCH or L-PDCCH) used in the LTE(-A) system may be allocated to a control region of a subframe. In FIG. 16, an L-PDCCH region refers to a region to which the legacy PDCCH is allocated. In the context, the L-PDCCH region may refer to a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 5). The PDCCH allocated to the data region is referred to as an E-PDCCH. As illustrated in FIG. 16, a channel resource may be additionally ensured through the E-PDCCH to alleviate scheduling restrictions due to limited control channel resource of an L-PDCCH region.

In detail, the E-PDCCH may be detected/demodulated based on a DM-RS. The E-PDCCH may be configured to be transmitted over a PRB pair on the time axis. In more detail, a search space (SS) for E-PDCCH detection may be configured with one or more (e.g., 2) E-PDCCH candidate sets. Each E-PDCCH set may occupy a plurality of (e.g., 2, 4, or 8) PRB pairs. An enhanced-CCE (E-CCE) constituting an E-PDCCH set may be mapped in the localized or distributed form (according to whether one E-CCE is distributed in a plurality of PRB pairs). In addition, when E-PDCCH based scheduling is configured, a subframe for transmission/detection of an E-PDCCH may be determined. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and attempt DCI detection on an L-PDCCH CSS and an L-PDCCH USS in a subframe (non-E-PDCCH subframe) in which transmission/detection of E-PDCCH is not configured.

In the case of the E-PDCCH, in terms of one UE, a USS may include K E-PDCCH set(s) (for each CC/for each cell). K may be greater than or equal to 1 and equal to or smaller than a specific upper limit (e.g., 2). In addition, each E-PDCCH set (within a PDSCH region) may be configured with N PRBs. Here, N and PRB resource/index configured with the N PRBs may be independently (i.e., set-specifically) allocated for each respective E-PDCCH set. Accordingly, the number and index of E-CCE resources configured with each E-PD-CCH set may be configured (UE-specially and) set-specifically. A PUCCH resource/index linked to each E-CCE resource/index may also be allocated (UE-specifically and) set-specifically by independently configuration a start PUCCH resource/index for each respective E-PDCCH set. Here, the E-CCE may refer to a basic control channel unit of an E-PDCCH including a plurality of REs (within a PRB in a PDSCH region). The E-CCE may have different structures according to an E-PDCCH transmission form. For example, an E-CCE for localized transmission may be configured using an RE belonging in the same PRB pair. On the other hand, an E-CCE for distributed transmission may be configured with an RE extracted from a plurality of PRB pairs. In the case of the localized E-CCE, in order to perform optimum beam-forming on each user, an antenna port (AP) may be independently used for each respective E-CCE resource/index. On the other hand, in the case of distributed E-CCE, the same antenna port set may be repeatedly used in different E-CCEs such that a plurality of users may commonly use antenna ports. The E-CCE may be referred to as an eCCE.

Like an L-PDCCH, an E-PDCCH carriers DCI. For example, the E-PDCCH may carry DL scheduling information and UL scheduling information. An E-PDCCH/PDSCH procedure and an E-PDCCH/PUSCH procedure are the same/similar to in steps S107 and S108 of FIG. 1. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The LTE(-A) system pre-reserves a PDCCH candidate region (hereinafter, a PDCCH search space) in a control region and transmits a PDCCH of a specific UE to a partial region of the PDCCH candidate region. Accordingly, the UE may acquire a PDCCH of the UE in the PDCCH search space via blind decoding. Similarly, the E-PDCCH may be transmitted over a partial or entire portion of a pre-reserved resource.

Figure 17:
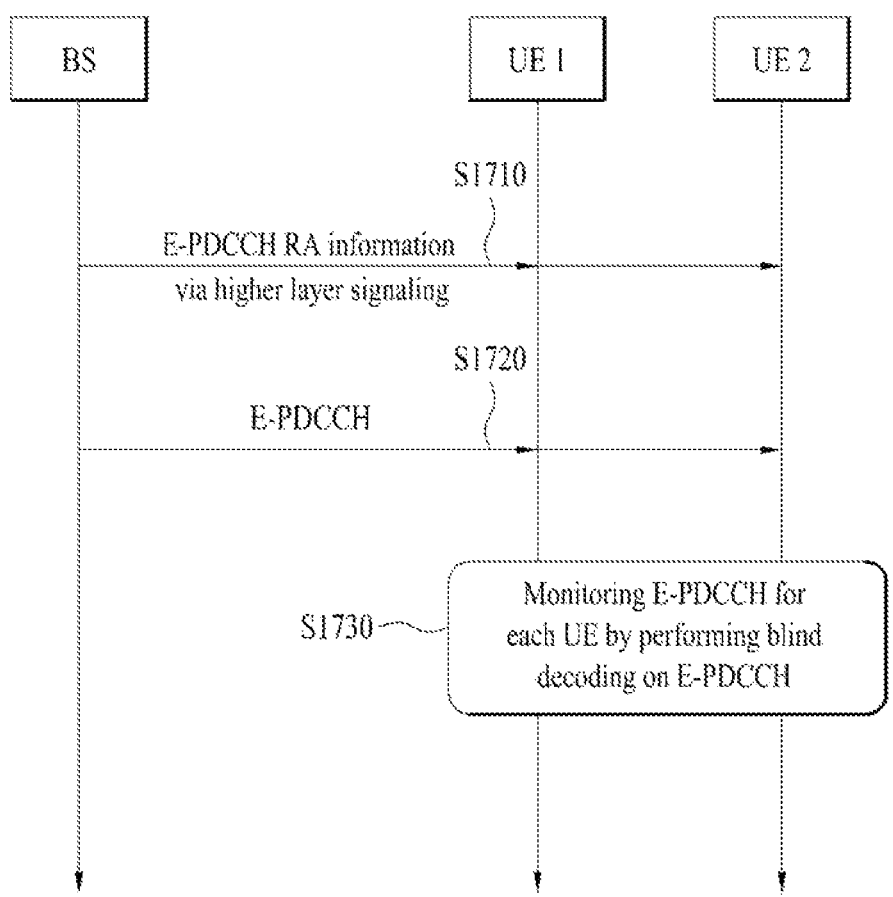
FIG. 17 illustrates resource allocation for an E-PDCCH and an E-PDCCH receiving procedure.

FIG. 17 illustrates resource allocation for an E-PDCCH and an E-PDCCH receiving procedure.

Referring to FIG. 17, a BS transmits E-PDCCH resource allocation (RA) information to a UE (S1710). The E-PDCCH RA information may include RB (or virtual resource block (VRB)) allocation information. The RB allocation information may be given in units of RB or resource block group (RBG). The RBG includes two or more consecutive RBs. The E-PDCCH RA information may be transmitted using higher layer (e.g., radio resource control layer and RRC layer) signaling. Here, The E-PDCCH RA information may be used to pre-reserve an E-PDCCH resource (region). Then the BS transmits an E-PDCCH to the UE (S1720). The E-PDCCH may be transmitted in a partial region or an entire region of the E-PDCCH resource (e.g., M RBs) that is reserved in step S1710. Accordingly, the UE may monitor a resource (region) (hereinafter, E-PDCCH search space) in which an E-PDCCH can be transmitted (S1730). The E-PDCCH search space may be given as a portion of the RB set allocated in step S1710. Here, the monitoring includes blind decoding or blind detection of a plurality of E-PDCCH candidates in the E-PDCCH search space.

The LTE-A system (a system according to 3GPP technology standard (TS) 36 series Release 9, 10) has introduced a PUCCH transmit diversity (TxD) transmission scheme such as spatial orthogonal resource transmit diversity (SORTD), etc. in order to enhance UL control information (UCI) based on PUCCH (e.g., to ensure UL coverage). In the case of SORTD, the same UCI information may be simultaneously transmitted through different PUCCH resources allocated to a plurality of (e.g., 2) antennas. For example, when ACK/NACK is transmitted through two antennas based on SORTD, two PUCCH resources for ACK/NACK transmission may be required. A first PUCCH resource of the two PUCCH resources may be determined as an implicit PUCCH resource linked to a lowest CCE index n_CCE constituting a DL grant PDCCH for scheduling DL data corresponding to ACK/NACK (refer to Equation 1) and a second PUCCH resource may be determined as an implicit PUCCH resource linked to a CCE index n_CCE+1 immediately after the lowest CCE index. For convenience, a PUCCH resource for transmission of ACK/NACK may be referred to as an ACK/NACK resource. Although two antennas are exemplified, the same principle may also be applied to the case in which three or more antennas are used.

As described above, the LTE-A system supports aggregation for a plurality of CCS/cells (i.e., carrier aggregation) for improving data throughput. In the case of carrier aggregation, an ACK/NACK transmission scheme such as a channel selection method may be used to feedback a plurality of ACK/NACKs for a plurality of DL data transmitted through a plurality of CCs/cells. As described above, in the channel selection method, a plurality of PUCCH resources for a plurality of CCs/cells (a plurality of transport block (TB) transmitted through the CCs/cells) is allocated and a combination of different PUCCH resources and/or QPSK modulation symbols may be selected/transmitted according to an ACK/NACK state. For example, in the case of CC/cell configured to transmit up to two TBs, two PUCCH resources may be allocated in order to ensure a plurality of PUCCH resources for channel selection. A first PUCCH resources of the two PUCCH resources may be determined as an implicit PUCCH resource linked to a lowest CCE index n_CCE constituting a DL grant PDCCH for scheduling DL data (refer to Equation 1) and a second PUCCH resource may be determined as an implicit PUCCH resource linked to an index n_CCE+1 immediately after the lowest CCE index. Although transmission of ACK/NACK for two DL data is exemplified, the same principle may also be applied to the case of transmission of ACK/NACK for three or more DL data.

Figure 18:
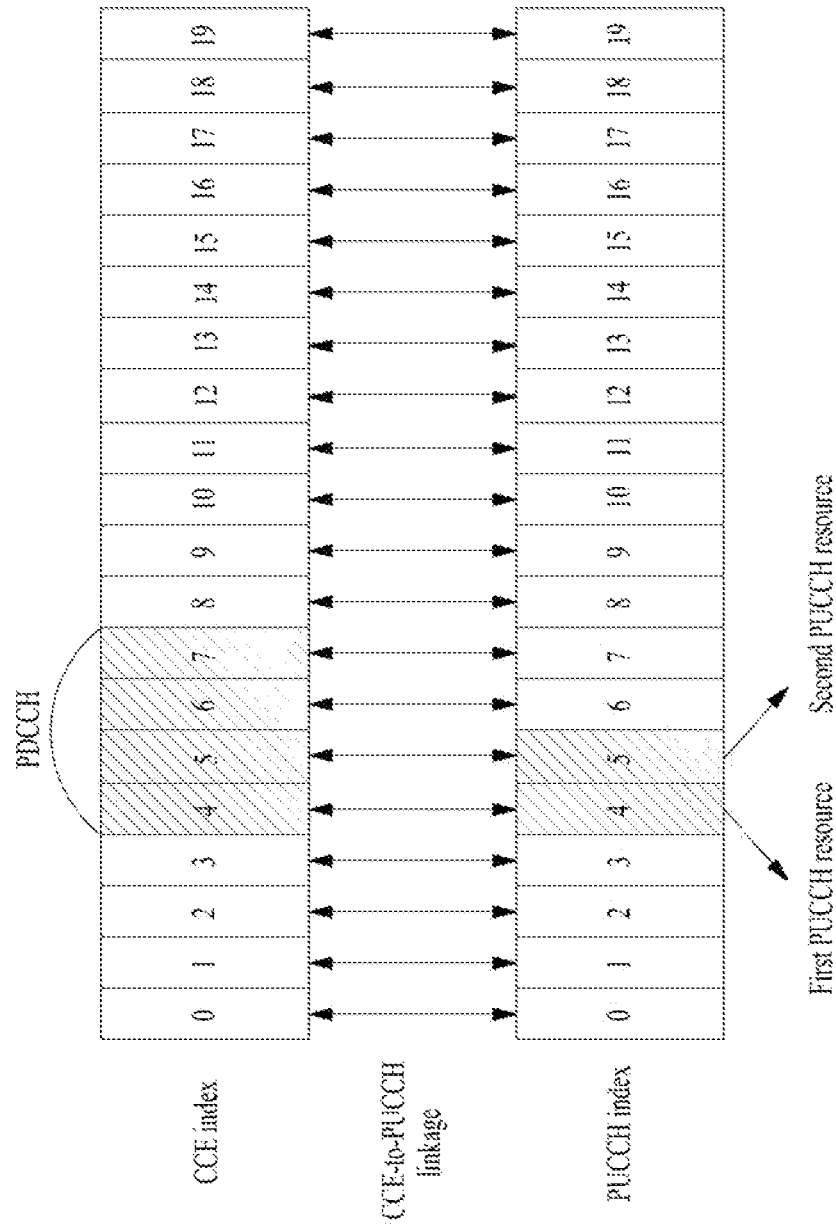
FIG. 18 illustrates an example for determining a PUCCH resource in the case of the SORTD method or the channel selection method.

FIG. 18 illustrates an example for determining a PUCCH resource in the case of the SORTD method or the channel selection method.

Referring to FIG. 18, a UE may monitor DL grant PDCCH and detect DL grant PDCCH from CCE indexes 4 to 7. In this case, a lowest CCE index constituting DL grant PDCCH is 4 and the DL grant PDCCH is configured with four CCEs (e.g., CCE indexes 4 to 7), and thus a CCE aggregation level may be 4. Accordingly, two PUCCH resources for the SORTD method or the channel selection method may be determined as a PUCCH resource (e.g., PUCCH resource 4) linked to a lowest CCE index (e.g., CCE index 4) and a PUCCH resource (e.g., PUCCH resource 5) linked to a CCE index (e.g., CCE index 5) immediately after the lowest CCE index.

As described above, the LTE-A system (e.g. a system according to 3GPP TS 36 series Release 10) may introduce a scheduling method using an E-PDCCH for providing more improved/effective control signaling. The scheduling method using the E-PDCCH may refer to a method for transmitting control information (e.g., PDCCH) through data (e.g., PDSCH) region. The E-PDCCH may be configured/transmitted based on an eCCE (or an E-CCE) that is a basic control unit corresponding to the concept of a CCE constituting an L-PDCCH. In addition, similarly to the legacy system, linkage between eCCE resource/index and PUCCH resource/index may also be pre-configured for a PUCCH resource for transmission of ACK/NACK for DL data scheduled by the DL grant E-PDCCH. Alternatively, a parameter (e.g., a start point of PUCCH resource/index linked to eCCE resource/index) for inferring linkage between eCCE resource/index and PUCCH resource/index may be pre-configured. Based on this, an ACK/NACK resource for DL data may be determined as an implicit PUCCH resource linked to a specific (e.g., lowest) eCCE index constituting an E-PDCCH for scheduling DL data. Hereinafter, the lowest eCCE index constituting an E-PDCCH may be referred to as n_eCCE.

In the case of E-PDCCH, a second ACK/NACK resource for applying feedback of a plurality of ACK/NACKs based on channel selection and ACK/NACK transmit diversity (TxD) based on SORTD may be determined as an implicit PUCCH resource linked to an eCCE index n_eCCE+1 immediately after the lowest eCCE index constituting an E-PDCCH. However, when an eCCE aggregation level is 1, the eCCE index n_eCCE+1 immediately after the lowest eCCE index may be used to configure another E-PDCCH, thereby causing collision in a PUCCH resource linked to the eCCE index n_eCCE+1. Likewise, when the legacy method is used, resource blocking may occur and E-PDCCH scheduling may be limited.

Figure 19:
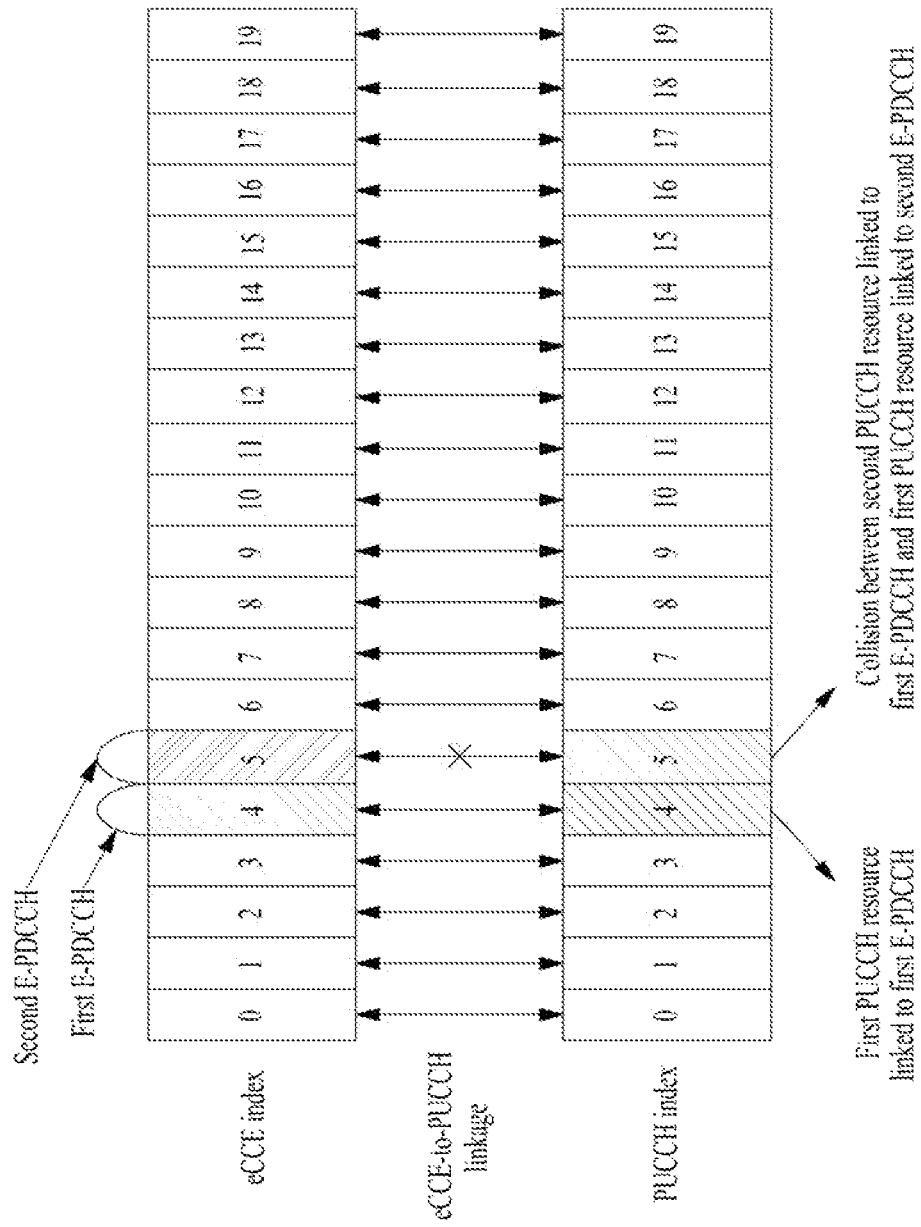
FIG. 19 illustrates resource blocking.

FIG. 19 illustrates resource blocking. In an example of FIG. 19, it is assumed that an ACK/NACK signal is fed back using two ACK/NACKs via the SORTD method or the channel selection method.

Referring to FIG. 19, a first E-PDCCH is configured with one eCCE with an eCCE index 4. A second E-PDCCH may be configured with one eCCE with an eCCE index 5. In this case, a first PUCCH resource for the first E-PDCCH may be determined as a PUCCH resource (e.g., PUCCH resource 4) linked to a lowest eCCE index constituting the first E-PDCCH and a second PUCCH resource for the first E-PDCCH may be determined as a PUCCH resource (e.g., PUCCH resource 5) liked to an index immediately after the lowest eCCE index. On the other hand, a first PUCCH resource for the second E-PDCCH may be determined as a PUCCH resource (e.g., PUCCH resource 5) linked with a lowest eCCE index constituting the second E-PDCCH. Thus collision may be caused in PUCCH resource 5, and thus a BS cannot configure the second E-PDCCH using eCCE index 5 during scheduling. That is, eCCE index 5 cannot be used to configure another E-PDCCH and is blocked, thereby limiting scheduling.

In this case, assuming that a UE accurately knows the number of eCCE resources constituting DL grant E-PDCCH scheduled to the UE, it may be possible to more appropriately and flexibly allocate a PUCCH resource (e.g., a second ACK/NACK resource) according to a size of an eCCE aggregation level (e.g., according to whether an eCCE aggregation level is 1 or an eCCE aggregation level is equal to or greater than 1). In addition, when the UE can recognize eCCE resource/index information contained in a PDSCH receiving region scheduled/allocated to the UE through DL grant E-PDCCH, it may be more preferable to use an implicit PUCCH resource linked to eCCE resource/index contained in the PDSCH receiving region as a PUCCH resource (e.g., a second ACK/NACK resource) in terms of PUCCH resource usage efficiency and scheduling flexibility.

Accordingly, the present invention proposes an effective ACK/NACK transmit resource allocation method appropriate for E-PDCCH-based DL data scheduling. In detail, the present invention proposes a method for allocating a plurality of ACK/NACK resources using a configuring method of a search space for E-PDCCH detection in consideration of SORTD-based ACK/NACK transmit diversity (TxD) transmission and channel selection-based feedback of a plurality of ACK/NACKs. In detail, in the method according to the present invention, a PUCCH resource linked to each resource index contained in the E-PDCCH and the PDSCH may be allocated to a plurality of ACK/NACK resources.

Hereinafter, a search space for E-PDCCH detection may be referred to as an E-SS. In addition, the number of eCCE resources constituting DL grant E-PDCCH may be referred to as an eCCE aggregation level. In addition, "eCCE contained in a scheduled PDSCH region" may refer to the case in which even some of REs constituting an eCCE are contained in the PDSCH region or the case in which all of the REs constituting the eCCE are contained in the PDSCH region. In addition, linkage between a PRB index and PUCCH resource/index is pre-configured or a parameter (e.g., a start point of PUCCH resource/index linked to PRB index) for inferring the linkage between the PRB index and the PUCCH resource/index is pre-configured, "eCCE constituting DL grant E-PDCCH" or "eCCE included in scheduled PDSCH region" may be replaced with "PRB constituting DL grant E-PDCCH" and "PRB contained in scheduled PDSCH region", respectively. In this case, the PRB may also refer to the case in which even some of REs constituting a PRB are contained in the E-PDCCH or PDSCH region or the case in which all of the REs constituting the PRB are contained in the E-PDCCH or PDSCH region. Hereinafter, when an ACK/NACK resource is inferred (or determined) based on a PRB index, the ACK/NACK resource allocating method according to the present invention can be applied irrespective of whether entire E-CCE resource/index information is applied.

When Entire E-CCE Resource/Index Information (Whole eCCE Map) is Provided

Entire eCCE resource/index assignment information in an entire PDSCH region may be provided to a UE. For convenience, the eCCE resource/index assignment information may be referred to as an eCCE map. In addition, E-SS resource information for E-PDCCH detection for a specific UE based on an eCCE map may be provided to the specific UE. Accordingly, the UE may recognize eCCE resource/index constituting E-SS based on the eCCE map. In this case, the entire eCCE map and E-SS resource information for the specific UE may be provided via higher layer signaling (e.g., RRC signaling, etc.).

Method 1-1

When eCCE resource/index for E-SS is known, two ACK/NACK resources may be determined as an implicit PUCCH resource linked to a specific (e.g., lowest) eCCE index constituting DL grant E-PDCCH and an implicit PUCCH resource linked to a specific (e.g., lowest) eCCE index contained in a PDSCH region scheduled by an E-PDCCH. In the method according to the present invention, a PUCCH linked to an eCCE index used by an E-PDCCH/PDSCH pair is allocated to an ACK/NACK resource, and thus eCCE blocking may be prevented irrespective of a size of an eCCE aggregation level.

Figure 20:
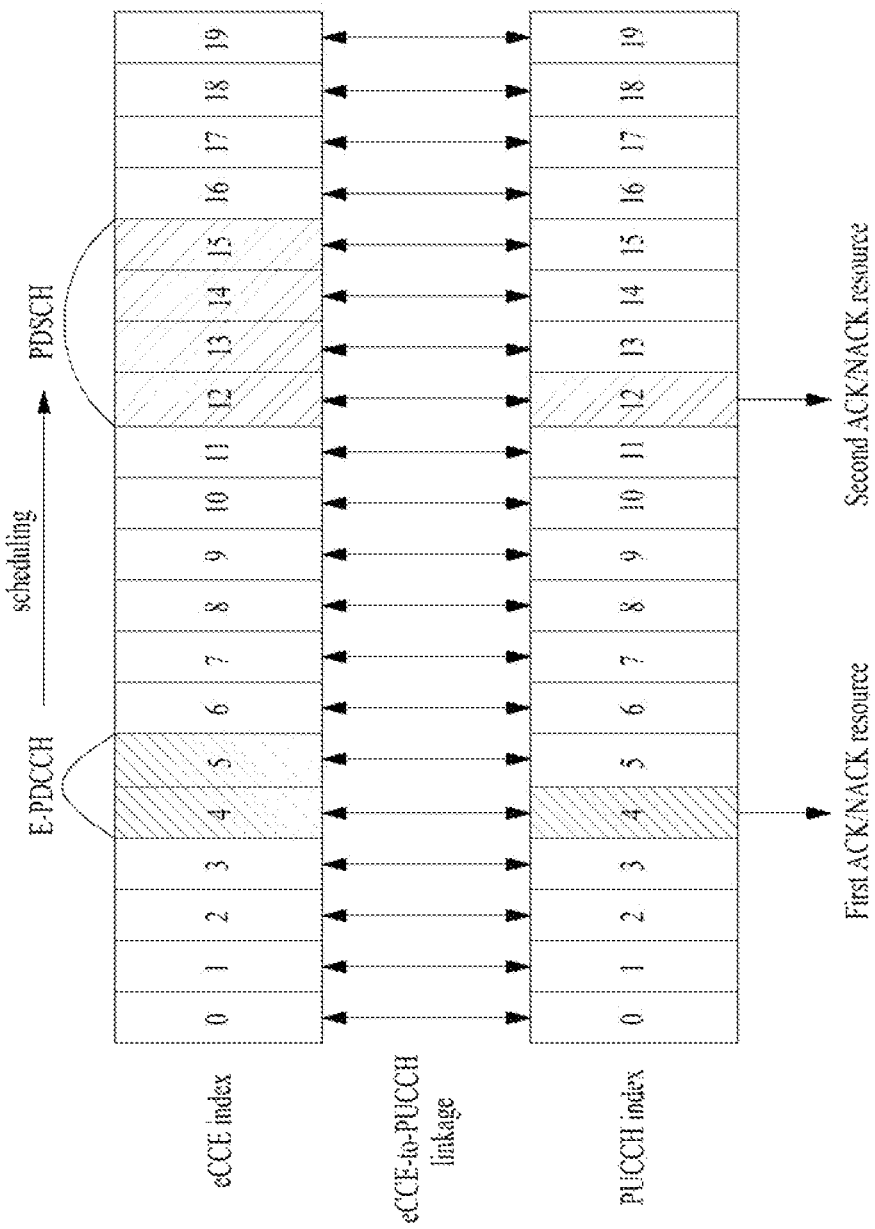
FIG. 20 illustrates a method for determining two PUCCH resources according to the present invention.

FIG. 20 illustrates a method for determining two PUCCH resources according to the present invention. In an example of FIG. 20, it is assumed that an eCCE is consecutively allocated in a localized resource allocation method. However, when a distributed resource allocation method is applied, the same principle of FIG. 20 may also be applied.

Referring to FIG. 20, an eCCE index constituting DL grant E-PDCCH is 4 and 5, a lowest eCCE index is 4. Accordingly, an index of an implicit PUCCH resource linked to a lowest eCCE index constituting DL grant E-PDCCH is 4. In addition, an eCCE index of a PDSCH scheduled by an E-PDCCH is 12 to 15, and thus a lowest eCCE index contained in a PDSCH region is 12. Accordingly, an index of an implicit PUCCH resource linked to a lowest eCCE index contained in a PDSCH region scheduled by an E-PDCCH is 12.

In an example of FIG. 20, since an E-PDCCH is configured with two eCCEs (e.g., 4 and 5), when a conventional method is used, two ACK/NACK resources may be determined as a PUCCH resource 4 linked to a lowest eCCE index constituting the E-PDCCH and a PUCCH resource 5 after the PUCCH resource 4. Thus when two aggregation levels are used, eCCE blocking may not occur. However, assuming that an E-PDCCH is configured with one eCCE, blocking may occur in an eCCE index 5 in the conventional method. On the other hand, even if an E-PDCCH is configured one eCCE, blocking does not occur in an eCCE index 5 in the method according to the present invention.

The example of FIG. 20 is merely an example, and another eCCE index and a PUCCH index, and linkage therebetween may be used. In addition, although the case in which a specific eCCE index is determined as a PUCCH resource linked to a lowest eCCE index has been exemplified, the specific eCCE index may be determined using another method.

Method 1-2

Unlike in Method 1-1, other information instead of a specific eCCE index constituting DL grant E-PDCCH may be used. Two ACK/NACK resources may be determined as two implicit PUCCH resources linked to two specific (e.g., lowest) eCCE indexes contained in a scheduled PDSCH region. For example, two ACK/NACK resources may be determined as an implicit PUCCH resource linked to a lowest eCCE index contained in a PDSCH region and an implicit PUCCH resource linked to a second lowest eCCE index contained in the PDSCH region. Similarly, in the method according to the present invention, a PUCCH resource linked to an eCCE index used by a PDSCH is allocated as an ACK/NACK resource, and thus eCCE blocking may be prevented irrespective of a size of an eCCE aggregation level.

FIG. 21 illustrates a method for determining two PUCCH resources according to the present invention. In an example of FIG. 21, an E-PDCCH and a PDSCH may be configured from different resource blocks (RBs) according to a distribute resource allocation method. For example, assuming four eCCEs constitute one RB, the E-PDCCH may be configured with eCCE indexes 4 and 16 and the PDSCH may be configured with eCCE indexes 0, 8, 12, and 17 in the example of FIG. 21. The resource allocation of FIG. 21 is merely an example and the same principle of FIG. 21 may also be applied to resource allocating using another method.

Referring to FIG. 21, an eCCE index contained in a PDSCH region scheduled by an E-PDCCH is 0, 8, 12, and 17, and thus a lowest eCCE index contained in the PDSCH region is 0 and a second lowest eCCE index is 8. Thus, when Method 1-2 is sued, two PUCCH resources may be determined as PUCCH resources (e.g., PUCCH indexes 0 and 8) linked to eCCE indexes 0 and 8. In addition, when Method 1-1 is used, a lowest eCCE index constituting an E-PDCCH is 4 and a lowest eCCE index contained in the PDSCH is 0, and thus two ACK/NACK resources may be determined as a PUCCH resource (e.g., PUCCH index 4) linked with a lowest eCCE index constituting an E-PDCCH and a PUCCH resource (e.g., PUCCH index 0) linked to a lowest eCCE index contained in a PDSCH.

On the other hand, when the conventional method is used, since a lowest eCCE index constituting an E-PDCCH is 4, two ACK/NACK resources may be determined as a PUCCH resource 4 linked to a lowest eCCE index constituting an E-PDCCH and PUCCH resource 5 linked to a second lowest eCCE index. In the conventional method, blocking may occur in eCCE index 5, but blocking may be prevented in the methods according to the present invention.

In Method 1-2, when PRB index-based ACK/NACK resource allocation is applied, only one PRB (PRB index n_PRB) may be allocated to a PDSCH. In this case, an implicit PUCCH resource linked to n_PRB is determined as a first ACK/NACK resource and an implicit PUCCH resource linked to a PRB index n_PRB+1 is determined as a second ACK/NACK resource, or an explicit PUCCH resource that is separately allocated via higher layer signaling (e.g., RRC signaling) may be determined as a second ACK/NACK resource.

Method 1-3

As another method, two ACK/NACK resources may be determined as two implicit PUCCH resources linked to two specific (e.g., lowest) eCCE indexes of all eCCEs including eCCEs constituting DL grant E-PDCCH and eCCEs contained in a PDSCH region (scheduled by an E-PDCCH). For example, two ACK/NACK resources may be determined as an implicit PUCCH resource linked to a lowest eCCE index of all eCCEs and an implicit PUCCH resource linked to a second lowest eCCE index of all eCCEs. Method 1-3 can be advantageously applied to the case in which a UE can accurately know an eCCE aggregation level of DL grant E-PDCCH.

FIG. 22 illustrates an example for determining two PUCCH resources according to the present invention. In an example of FIG. 22, the same situation as in FIG. 21 is assumed. However, the same principle of FIG. 22 can also be applied to a different resource allocation method from a distributed resource allocation method.

Referring to FIG. 22, an eCCE index constituting an E-PDCCH is 4 and 16 and an eCCE index contained in a PDSCH region scheduled by an E-PDCCH is 0, 8, 12, and 17, and thus all eCCEs are 0, 4, 8, 12, 16, and 17. Thus, a lowest lowest eCCE index of all eCCEs is 0 and a second lowest eCCE index of the all eCCEs is 4. Accordingly, when Method 1-3 is used, two ACK/NACK resources may be determined as a PUCCH resource (e.g., PUCCH index 0) linked to a lowest eCCE index of the all eCCEs and a PUCCH resource (e.g., PUCCH index 4) linked to a second lowest eCCE index of the all eCCEs. Accordingly, in Method 1-3, blocking may also be prevented irrespective of an eCCE aggregation level.

Method 1-4

Since a UE can know an eCCE aggregation level in Method 1-3, Method 1-3 can be modified so as to apply different methods according to eCCE aggregation levels. When an eCCE aggregation level is 1, Methods 1-1 to 1-3 can be applied in order to prevent resource blocking. When an eCCE aggregation level is greater than 1, DL grant E-PDCCH may be configured with two or more eCCEs. Accordingly, when the number of ACK/NACK resources is smaller than an eCCE aggregation level, even if a plurality of PUCCH resources linked to an eCCE index constituting an E-PDCCH is determined as ACK/NACK resources, resource blocking can be prevented. Thus, when an eCCE aggregation level is greater than 1, two implicit PUCCHs linked to two specific (e.g., lowest) eCCE indexes constituting DL grant E-PDCCH may be determined as two ACK/NACK resources.

For example, when an eCCE aggregation level is 1, two ACK/NACK resources may be determined using Methods 1-1 to 1-3. On the other hand, when an eCCE aggregation level is greater than 1, for example, referring back to FIG. 22, two ACK/NACK resources may be determined as implicit PUCCH resources linked to eCCE index 4 and eCCE index 16 constituting DL grant E-PDCCH.

A method to be selected/applied among Methods 1-1 to 1-4 may be explicitly signaled via higher layer signaling (e.g., RRC signaling), PDCCH/E-PDCCH, etc. or implicitly determined according to specific information associated with transmission of E-PDCCH/PDSCH. For example, the specific information associated with the transmission of E-PDCCH/PDSCH may include an antenna port, scrambling ID, and number of layers.

When a PRB that does not include an eCCE is present in an eCCE map, the current case is considered as a case in which only E-SS resource information is provided, and an ACK/NACK resource allocation method may be applied, as described below. The case in which the PRB that does not include an eCCE is present in the eCCE map may be the case in which the PRB does not include all REs constituting an eCCE or the case in which the PRB includes only some of REs constituting the eCCE.

When Entire E-CCE Resource/Index Information (Whole eCCE Map) is not Provided

So far, it has been assumed that entire eCCE resource/index assignment information and E-SS resource information for E-PDCCH detection for a specific UE are provided. However, the entire eCCE resource/index assignment information may not be provided and only E-SS resource information may be provided to the UE. The E-SS resource information for E-PDCCH detection may be provided to the UE via, for example, higher layer signaling (e.g., RRC signaling), etc. When only the E-SS resourced information without the entire eCCE resource/index assignment information is provided, the UE cannot accurately know whether an eCCE contained in a PDSCH region scheduled by DL grant E-PDCCH is present. Accordingly, the above methods can be modified as follows.

Method 2-1

According to whether an eCCE contained in a PDSCH scheduled by DL grant E-PDCCH on E-SS is present, an ACK/NACK resource allocation method may be varied. First, when the eCCE contained in the scheduled PDSCH region is present on E-SS, eCCE resource/index assignment information is provided, and thus an ACK/NACK resource allocation method can be applied in the same way as in the case in which entire eCCE resource/index assignment information is applied. When the eCCE contained in the scheduled PDSCH region is present on E-SS, for example, Methods 1-1 to 1-4 may be applied.

Method 2-2

On the other hand, when the eCCE contained in the scheduled PDSCH region is not present on E-SS, a specific eCC index contained in the PDSCH region cannot be used. Thus, in this case, an implicit PUCCH resource linked to a specific (e.g., lowest) eCCE index n_eCCE constituting DL grant E-PDCCH for scheduling a PDSCH may be determined as a first ACK/NACK resource, and an implicit PUCCH resource linked to an index n_eCCE+1 immediately after the specific eCCE index constituting the DL grant E-PDCCH or an explicit PUCCH resource that is separately allocated via higher layer (e.g., RRC) may be determined as a second ACK/NACK resource.

Method 2-3

When a UE can accurately know an eCCE aggregation level of DL grant E-PDCCH, different ACK/NACK resource allocation methods may be applied according to a size of eCCE aggregation level. When the eCCE aggregation level is 1, an implicit PUCCH resource linked to n_eCCE+1 or an explicit PUCCH resource based on a higher layer (e.g., RRC) may be determined as a second ACK/NACK resource. When the eCCE aggregation level is greater than 1, two implicit PUCCH resources linked to two specific (e.g., lowest) eCCE indexes constituting DL grant E-PDCCH may be determined as two ACK/NACK resources similarly to Method 1-4.

A method to be selected/applied among Methods 2-1 to 2-3 may be explicitly signaled via higher layer signaling (e.g., RRC signaling), PDCCH/E-PDCCH, etc. or implicitly determined according to specific information associated with transmission of E-PDCCH/PDSCH. For example, the specific information associated with the transmission of E-PDCCH/PDSCH may include an antenna port, scrambling ID, and number of layers.

When DL Grant is Received Through an L-PDCCH

So far, the present invention has been described in terms of an E-PDCCH and an eCCE, the present invention is not limited only to the case of E-PDCCH. For example, E-SS resource information and/or eCCE map information may be provided and DL grant for PDSCH scheduling may be transmitted through an L-PDCCH instead of an E-PDCCH. In this case, similarly to Method 1-1, an ACK/NACK resource may be determined. For example, an implicit PUCCH resource linked to a lowest CCE index n_CCE constituting an L-PDCCH may be determined as a first ACK/NACK resource and an implicit PUCCH resource linked to a specific (e.g., lowest) eCCE index contained in a PDSCH region scheduled by an L-PDCCH may be determined as a second ACK/NACK resource.

Alternatively, when an eCCE contained in a scheduled PDSCH region is not present, an ACK/NACK resource may be determined similarly to Method 2-2. For example, an implicit PUCCH resource linked to an index n_CCE+1 immediately after a lowest CCE index constituting an L-PDCCH or an explicit PUCCH resource based on higher layer (e.g., RRC) may be determined as a second ACK/NACK resource.

As another method, an ACK/NACK resource may be determined similarly to Method 1-2. For example, two implicit PUCCH resources linked to two specific (e.g., lowest) eCCE indexes contained in a scheduled PDSCH region without CCE information of DL grant L-PDCCH may be determined as two ACK/NACK resources. In this case, when PRB index-based ACK/NACK resource allocation is applied and only one PRB (index n_PRB) is allocated to a PDSCH, an implicit PUCCH resource linked to n_PRB may be determined as a first ACK/NACK resource and an implicit PUCCH resource linked to an index n_PRB+1 or an explicit PUCCH resource that is separately allocated via higher layer (e.g., RRC) may be determined as a second ACK/NACK resource.

In addition, it may be possible to consider an L-PDCCH as an E-PDCCH and to determine an ACK/NACK resource using Methods 1-3, 1-4, 2-1, and 2-3.

A method to be selected/applied may be explicitly signaled via higher layer signaling (e.g., RRC signaling), PDCCH/E-PDCCH, etc. or implicitly determined according to specific information associated with transmission of PDCCH/PDSCH. For example, the specific information associated with the transmission of PDCCH/PDSCH may include an antenna port, scrambling ID, and number of layers.

PDSCH Received without DL Grant PDCCH (PDSCH without PDCCH)

E-SS resource information and/or an eCCE map may be provided and a PDSCH without DL grant PDCCH (PDSCH without PDCCH) may be received. For example, a BS may schedule PDSCH transmission via semi-persistent scheduling (SPS) via a higher layer (e.g., RRC) and may not transmit a PDCCH whenever a PDSCH is transmitted. Accordingly, when a PDSCH is received without DL grant, two implicit PUCCH resources linked to two specific (e.g., lowest) eCCE indexes contained in a region of a PDSCH (PDSCH without PDCCH) received without a PDCCH may be determined as two ACK/NACK resources similarly to Method 1-2.

However, an eCCE contained in a PDSCH region may not be present. In this case, unlike in Methods 2-1 to 2-3, an eCCE (or CCE) index of an E-PDCCH (or L-PDCCH) cannot be used. Accordingly, two explicit PUCCH resources allocated via a higher layer (e.g., RRC) may be determined as two ACK/NACK resources.

In this case, when PRB index-based ACK/NACK resource allocation is applied and only one PRB (index n_PRB) is allocated to a corresponding PDSCH, an implicit PUCCH resource linked to n_PRB may also be determined as a first ACK/NACK resource, and an implicit PUCCH resource linked to an index n_PRB+1 or an explicit PUCCH resource that is separately allocated via a higher layer (e.g., RRC) may also be determined as a second ACK/NACK resource.

When only one ACK/NACK resource corresponding to a PDSCH (PDSCH without PDCCH) received without a PDCCH is required (e.g., when non-transmit diversity (non-TxD)-based PUCCH transmit mode and/or a DL transmit mode in which up to one transport block is possible are configured), one implicit PUCCH resource linked to a specific (e.g., lowest) eCCE index contained in a PDSCH region may be determined as an ACK/NACK resource. Alternatively, when an eCCE contained in a PDSCH region is not present, one explicit PUCCH resource allocated via a higher layer (e.g., RRC) may be determined as an ACK/NACK resource.

PDCCH that does not Schedule PDSCH (PDCCH without PDSCH)

E-SS resource information and/or an eCCE map may be provided and ACK/NACK feedback is required, but a PDCCH (PDCCH without PDSCH) that does not schedule a PDSCH may be received. For example, a PDCCH indicating SPS configuration release may not schedule a PDSCH, but a UE may transmit ACK/NACK for the PDCCH indicating SPS release. The PDCCH indicating SPS release may be received in the form of E-PDCCH. In this case, since an eCCE contained in a PDSCH region is not present, an ACK/NACK resource may be determined using the same or similar method to Method 2-2.

When ACK/NACK resource allocation is inferred based on only a PRB index contained in a scheduled PDSCH region, a PDSCH scheduled from a PDCCH (PDCCH without PDSCH) is not defined, and thus a PRB (index) contained in a PDSCH region and a PUCCH resource (index) linked thereto may not also be present/inferred. Accordingly, the present invention proposes a method for transmitting a PDCCH (PDCCH without PDSCH) that does not schedule a PDSCH using a legacy L-PDCCH method, but not the form of E-PDCCH when E-PDCCH-based scheduling is configured to be applied. Accordingly, two ACK/NACK resources may be determined as an implicit PUCCH resource linked to a lowest CCE index n_CCE constituting a PDCCH (PDCCH without PDSCH) transmitted based on an L-PDCCH and an implicit PUCCH resource linked to a CCE index n_CCE+1 immediately after the lowest CCE index.

So far, for convenience of description, a method for allocating/determining two ACK/NACK resources (i.e., a first ACK/NACK resource and a second ACK/NACK resource) from one E-PDCCH/PDSCH pair, an L-PDCCH/PDSCH pair, or a PDSCH has been described. However, this is merely an example and the present invention may also be applied in the same way or similarly even when allocation of three or more ACK/NACK resources (or PUCCH resource) is required for specific reason/purpose, etc. For example, referring to FIG. 20, assuming that a UE can accurately know an eCCE aggregation level of DL grant E-PDCCH, the total number of E-PDCCHs and eCCEs resources/indexes contained in a PDSCH region scheduled from the E-PDCCHs may be six. Accordingly, up to six PUCCH resources (e.g., PUCCH indexes 4, 5, 12, 13, 14, and 15) can be used, and thus SORTD transmission through up to six antennas and ACK/NACK transmission using up to six PUCCH resources may be possible.

When only one ACK/NACK resource is allocated to one E-PDCCH/PDSCH pair or L-PDCCH/PDSCH pair, one ACK/NACK transmission resource may also be determined as an implicit PUCCH resource linked to a specific CCE index constituting an L-PDCCH or a specific eCCE constituting an E-PDCCH or as an implicit PUCCH linked to a specific eCCE index contained in a scheduled PDSCH region. In this case, a method to be selected/applied may also be explicitly signaled via higher layer signaling (e.g., RRC signaling), PDCCH/E-PDCCH, etc. or may also be implicitly determined according to specific information associated with transmission of (E-)PDCCH/PDSCH. For example, the specific information associated with the transmission of (E-)PDCCH/PDSCH may include an antenna port, scrambling ID, and number of layers.

Even if the aforementioned method for determining an ACK/NACK resource (one of Methods 1-1 to 1-4, Methods 2-1 to 2-3, the method for the case in which DL grant is received through an L-PDCCH, the method for a PDSCH (PDSCH without PDCCH) received without DL grant PDCCH, and the method for PDCCH (PDCCH without PDSCH) that does not schedule a PDSCH) is applied, ACK/NACK resources may collide with each other between different users or different layers during MIMO transmission of multi-layer)/multi-user for E-PDCCH/PDSCH. In addition, an ACK/NACK resource linked to a CCE for an L-PDCCH and an ACK/NACK resource linked to an eCCE for an E-PDCCH may collide with each other. Accordingly, according to the present invention, in order to prevent collision between the ACK/NACK resources, "an implicit PUCCH resource/index n_PUCCH linked to a specific (e.g., lowest) eCCE index n_eCCE" contained in DL grant E-PDCCH/PDSCH transmission region may be determined as "an implicit PUCCH resource linked to an eCCE index (n_eCCE+n_offset) obtained by adding a specific offset n_offset to a specific eCCE index n_eCCE" or "PUCCH resource/index (n_PUCCH+n_offset) obtained by adding a specific offset n_offset to an implicit PUCCH resource/index n_PUCCH linked to a specific eCCE index n_eCCE". For convenience, the specific offset n_offset may be referred to as "offset ACK/NACK resource indicator (ARI)" or simply referred to as "ACK/NACK resource offset (ARO)". The specific offset n_offset may be explicitly signaled via higher layer (e.g., RRC), PDCCH/E-PDCCH, etc. or may be implicitly determined according to specific information associated with E-PDCCH/PDSCH transmission. For example, the specific information associated with E-PDCCH/PDSCH transmission may include an antenna port, scrambling ID, and number of layers.

Equation 2 shows a method for determining an ACK/NACK resource using offset ARI or ARO. When the offset ARI or ARO is added, Equation 1 may be corrected to Equation 2.

$$n_{PUCCH}^{(1)} = n_{CCE} + N_{PUCCH}^{(1)} + n\_offset \quad \text{[Equation 2]}$$

In Equation 2, $n^{(1)}_{PUCCH}$ is a resource index indicating an ACK/NACK resource, $N^{(1)}_{PUCCH}$ is a value signaled via higher-layer signaling, $n_{CCE}$ is the lowest index of eCCE indexes constituting an E-PDCCH, and n_offset indicates offset ARI or ARO. Equation 2 is a merely an example, and additional calculation may be performed on each parameter or other parameters may be used in order to determine an ACK/NACK resource.

Table 10 below shows a method for signaling offset ARI (or ARO) through DCI format. As described below, values shown in Table 10 may be signaled through an added field for ACK/NACK resource information in the DCI format or offset ARI (or ARO) may be signaled using an existing field (e.g., a transmit power control (TPC) field) in the DCI format.

TABLE 10

| field in DCI format | n_offset |
|---|---|
| 0 | 0 |
| 1 | −1 |
| 2 | −2 |
| 3 | 2 |

In the case of the LTE-A system, a BS may configure a plurality of explicit PUCCH (e.g., format 1b or 3) resources (sets) through a higher layer (e.g., RRC) and information indicating one resource (set) of the configured resources (sets) may be transmitted through a DL grant PDCCH (refer to Table 9). For convenience, the indicating information may be referred to as "index ARI" or simply referred to as "ARI". For example, the ARI may indicate one of four PUCCH resources.

A TPC field in the DCI format indicates a change amount of transmit power for transmit power control. However, when a plurality of carriers is aggregated, a value indicating transmit power control may be received through a TPC field in the DCI format received through PCC/Pcell. That is, the legacy PUCCH transmit control method refers to a TPC command in DL grant PDCCH that schedules PCC/Pcell. Accordingly, a TPC field in the DCI format received through SCC/SCell may not be used for original use (transmit power control).

Accordingly, the specific offset (ARO or offset ARI) that is applied to determine a first ACK/NACK resource and/or a second ACK/NACK resource for CC/cell based on the aforementioned ACK/NACK resource determining method or other methods is explicitly signaled through DL grant E-PDCCH, a method (hereinafter, referred to as "add ARI field") for adding a new field (e.g., 2-bit field) for offset ARI signaling in DL grant DCI format for signaling of offset ARI or a method (hereinafter, referred to as "reuse existing field") for reusing an existing specific field (e.g., a transmit power control (TPC) field) in DL grant DCI format may be considered. Accordingly, in order to maintain a legacy PUCCH transmit power control method that refers to a TPC command in DL grant (E-)PDCCH for scheduling PCC/Pcell and to simultaneously reduce control channel overhead due to unnecessary increase in DCI format, the present invention proposes the following method for configuring and applying an ARI field according to scheduling target CC/cell and PUCCH ACK/NACK transmission mode, and whether cross-CC is scheduled.

Method 3

In the case of DL grant E-PDCCH for scheduling PCC/Pcell
  ARI field configuration: add ARI field
  ARI application method: offset ARI
In the case of DL grant E-PDCCH for scheduling SCC/Scell
  when ACK/NACK transmission mode is configured in PUCCH format 3
    ARI field configuration: reuse existing field (e.g., reuse TPC field)

ARI application method: index ARI

When an ACK/NACK transmission mode is configured for channel selection and cross-CC scheduling is configured ARI field configuration: reuse existing field (e.g., reuse TPC field)

ARI application method: offset ARI

When an ACK/NACK transmission mode is configured for channel selection and cross-CC scheduling is not configured ARI field configuration: reuse existing field (e.g., reuse TPC field)

ARI application method: index ARI

FIG. 23 is a flowchart of a method for signaling ACK/NACK resource information according to the present invention. In an example of FIG. 23, it is assumed that a first carrier and a second carrier are aggregated for a UE. The first carrier may be PCC/Pcell and the second carrier may be SCC/Scell. As described with reference to FIG. 12, when a plurality of carriers is aggregated, the UE may transmit an ACK/NACK signal through PCC/Pcell.

Referring to FIG. 23, the UE may receive DL control information (e.g., DCI format) from a BS through DL grant E-PDCCH (step S2302). The DL control information (e.g., DCI format) may include a field (e.g., TPC field) for power transmission control information and a field for resource allocation information for scheduling a PDSCH. In addition, the DCI format may include ACK/NACK resource information (e.g., offset ARI or index ARI) for preventing collision of ACK/NACK resources.

In step S2304, the UE may receive DL data using resource allocation information received in step S2302. Then, in step S2306, the UE may transmit the ACK/NACK signal for the DL data received in step S2304. The ACK/NACK signal may be transmitted through the first carrier and in this case, the first carrier may be PCC/Pcell.

When the E-PDCCH schedules the first carrier, DL data may be received in the first carrier in step S2304. In this case, according to the present invention, a field for ACK/NACK resource information may be added in the DL control information (e.g., DCI format) received through an E-PDCCH and a field for ACK/NACK resource information may contain ACK/NACK resource offset information (e.g., offset ARI or ARO).

When the E-PDCCH schedules a second carrier, DL data may be received on the second carrier in step S2304. When DL control information is received on the first carrier and DL data is received on the second carrier, the current case may correspond to the case in which cross carrier scheduling is configured. In addition, when DL control information and DL data are received on the second carrier, the current case may correspond to the case in which carrier scheduling configuration is released. According to the present invention, when the E-PDCCH schedules the second carrier, ACK/NACK resource information (e.g., offset ARI or index ARI) through a field (e.g., a TPC field) for power transmission control information in DL control information (e.g., a DCI field). In detail, ACK/NACK resource information may be varied according to an ACK/NACK transmission mode and whether cross carrier is configured.

According to the present invention, when cross carrier scheduling is configured and an ACK/NACK signal transmission mode is set as channel selection, ACK/NACK resource offset information (e.g., offset ARI or ARO) may be received through a field (e.g., TPC field) for power transmission control information in DL control information (e.g., a DCI field).

In addition, when cross carrier scheduling is not configured and an ACK/NACK signal transmission mode is set as channel selection, ACK/NACK resource indication information (e.g., index ARI) may be received through a field (e.g., a TPC field) for power transmission control information in DL control information (e.g., a DCI field).

When DL data is received on the second carrier, an ACK/NACK signal transmission mode is configured in PUCCH format 3, ACK/NACK resource indication information (e.g., index ARI) may be received through a field (e.g., a TPC field) for power transmission control information in DL control information (e.g., a DCI field).

When ACK/NACK resource offset information (e.g., offset ARI) is received, an ACK/NACK resource may be determined using ACK/NACK resource offset information and implicit PUCCH resource/index n_PUCCH linked to a specific (e.g., lowest) eCCE index n_eCCE within a DL grant E-PDCCH/PDSCH transmission region (refer to Equation 2). For example, calculation such as addition, subtraction, multiplication, and division may be performed using ACK/NACK resource offset information and implicit PUCCH resource/index n_PUCCH or other information in order to determine an ACK/NACK resource.

On the other hand, when ACK/NACK resource indication information (e.g., index ARI) is received, the ACK/NACK resource indication information may indicate one of a plurality of ACK/NACK resources that is pre-configured via, for example, a higher layer (e.g., RRC). In this case, a UE may transmit an ACK/NACK signal using an ACK/NACK resource indicated by the ACK/NACK resource indication resource. An ACK/NACK signal may be transmitted using an ACK/NACK resource indicated by the ACK/NACK resource indication resource. An ACK/NACK signal may be transmitted using an ACK/NACK resource indicated by an index ARI. As described above, for example, four ACK/NACK resources may be pre-configured via higher layer signaling (e.g., RRC signaling) and an ARI may indicate one of the four ACK/NACK resources. In this case, the ACK/NACK resource is explicitly indicated, and thus calculation for implicit PUCCH resource/index may not be performed. However, other calculation may be further performed.

In an FDD situation, when an ACK/NACK transmission mode is configured in PUCCH format 3, a more detailed ARI application method is proposed as follows for the case in which an ARI field is added to a DL grant E-PDCCH for scheduling PCC/Pcell or a DL grant E-PDCCH transmitted through PCC/Pcell. Since the DL grant E-PDCCH schedules PCC/Pcell or is received through PCC/Pcell, the current case may correspond to the case in which cross-CC scheduling is configured.

Method 4 (FDD & PUCCH Format 3)

In the case of DL grant E-PDCCH for scheduling PCC/Pcell

ARI transmission field: added ARI field

ARI application method: offset ARI

In the case of DL grant E-PDCCH for scheduling SCC/Scell

Method 4-1

ARI transmission field: existing field (e.g., existing TPC field)

ARI applying method: index ARI

In this case, an added ARI field may be set as a pre-defined fixed value (e.g., bit "0") or set as a reserved field.

Method 4-2

ARI transmission field: added ARI field

ARI application method: index ARI

In this case, an existing field (e.g., existing TPC field) may be set as a pre-defined fixed value (e.g., bit "0") or set as a reserved field.

In addition, in an FDD situation, when an ACK/NACK transmission mode is configured as channel selection, a more detailed ARI application method is proposed as follows for the case in which an ARI field is added to a DL grant E-PDCCH for scheduling PCC/Pcell or a DL grant E-PDCCH transmitted through PCC/Pcell.

Method 5 (FDD & Channel Selection)
In the case of DL grant E-PDCCH for scheduling PCC/Pcell
ARI transmission field: added ARI field
ARI application method: offset ARI
In the case of DL grant E-PDCCH for scheduling SCC/Scell
Method 5-1
ARI transmission field: existing field (e.g., existing TPC field)
ARI application method: offset ARI
In this case, an added ARI field may be set as a pre-defined fixed value (e.g., bit "0") or set as a reserved field.
Method 5-2
ARI transmission field: added ARI field
ARI application method: offset ARI
In this case, an existing field (e.g., existing TPC field) may be set as a pre-defined fixed value (e.g., bit "0") or set as a reserved field.

In a TDD situation, when an ACK/NACK transmission mode is configured in PUCCH format 3, a more detailed ARI application method is proposed as follows for the case in which an ARI field is added to a DL grant E-PDCCH for scheduling PCC/Pcell or a DL grant E-PDCCH transmitted through PCC/Pcell.

Method 6 (TDD & PUCCH Format 3)
In the case of DL grant E-PDCCH corresponding to a (first) DAI initial value (e.g., 1) while scheduling PCC/Pcell
ARI transmission field: added ARI field
ARI application method: offset ARI
In the case of DL grant E-PDCCH that does not correspond to a (first) DAI initial value (e.g., 1) while scheduling PCC/Pcell and/or DL grant E-PDCCH for scheduling SCC/Scell
Method 6-1
ARI transmission field: existing field (e.g., existing TPC field)
ARI application method: index ARI
In this case, an added ARI field may be set as a pre-defined fixed value (e.g., bit "0") or set as a reserved field.
Method 6-2
ARI transmission field: added ARI field
ARI application method: index ARI
In this case, an existing field (e.g., existing TPC field) may be set as a pre-defined fixed value (e.g., bit "0") or set as a reserved field.

In addition, in a TDD situation, when an ACK/NACK transmission mode is configured as channel selection, a more detailed ARI application method is proposed as follows for the case in which an ARI field is added to a DL grant E-PDCCH for scheduling PCC/Pcell or a DL grant E-PDCCH transmitted through PCC/Pcell. Hereinafter, M refers to the number of DL subframes (i.e., DL subframes as ACK/NACK feedback target through a corresponding UL subframe) linked to one UL subframe. For example, when M is 1, the number of DL subframes as ACK/NACK feedback target through a UL subframe is 1, when M is 2, the number of DL subframes as ACK/NACK feedback target through a UL subframe is 2, when M is 3, the number of DL subframes as ACK/NACK feedback target through a UL subframe is 3, and when M is 4, the number of DL subframes as ACK/NACK feedback target through a UL subframe is 4.

In a TDD situation, when an ACK/NACK transmission mode is configured as channel selection, even if M is 3 or more, only a PUCCH resource of the case of DAI=1 or 2 is used for channel selection. Thus, in the case of a DL grant E-PDCCH corresponding to DAI=3 or 4, offset ARI or index ARI is not applied.

Method 7 (TDD & Channel Selection)
M=1 or 2
In the case of DL grant E-PDCCH for scheduling PCC/Pcell
ARI transmission field: added ARI field
ARI application method: offset ARI
In the case of DL grant E-PDCCH for scheduling SCC/Scell
Method 7-1
ARI transmission field: existing field (e.g., existing TPC field)
ARI application method: offset ARI
In this case, an added ARI field may be set as a pre-defined fixed value (e.g., bit "0") or set as a reserved field.
Method 7-2
ARI transmission field: added ARI field
ARI application method: offset ARI
In this case, an existing field (e.g., existing TPC field) may be set as a pre-defined fixed value (e.g., bit "0") or set as a reserved field.
M=3 or 4
In the case of DL grant E-PDCCH corresponding to DAI=1 or 2 while scheduling PCC/Pcell
ARI transmission field: added ARI field
ARI applying method: offset ARI
In the case of DL grant E-PDCCH corresponding to DAI=1 or 2 while scheduling SCC/Scell
Method 7-3
ARI transmission field: existing field (e.g., existing TPC field)
ARI applying method: offset ARI
In this case, an added ARI field may be set as a pre-defined fixed value (e.g., bit "0") or set as a reserved field.
Method 7-4
ARI transmission field: added ARI field
ARI application method: offset ARI
In this case, an existing field (e.g., existing TPC field) may be set as a pre-defined fixed value (e.g., bit "0") or set as a reserved field.
In the case of DL grant E-PDCCH corresponding to DAI=3 or 4 while scheduling PCC/Pcell
no ARI application
In this case, an added ARI field may be set as a pre-defined fixed value (e.g., bit "0") or set as a reserved field.
an existing TPC field is used for transmission power control
In the case of DL grant E-PDCCH corresponding to DAI=3 or 4 while scheduling SCC/Scell
no ARI application
In this case, an added ARI field and/or an existing field (e.g., an existing TPC field) may be set as a pre-defined fixed value (e.g., bit "0") or set as a reserved field.

The ARI field configuration and the application method according to the above proposed scheduling target CC/cell and PUCCH ACK/NACK transmission mode, and whether cross-scheduling is present are not limited only to a DL grant E-PDCCH. For example, the proposed method can also be applied to the case of DL grant L-PDCCH using the same/ similar principle/operation. For example, the proposed method can also be applied to the case in which a DL grant L-PDCCH for scheduling PCC/Pcell and a DL grant L-PDCCH for scheduling SCC/Scell are received using the same/ similar principle/operation.

So far, various embodiments have been described with regard to the method according to the present invention. In each embodiment, some components can be excluded or other components can be further added and embodiments can be implemented. In addition, these embodiments can be applied independently or combined with each other and the embodiments can be implemented.

Figure 24:
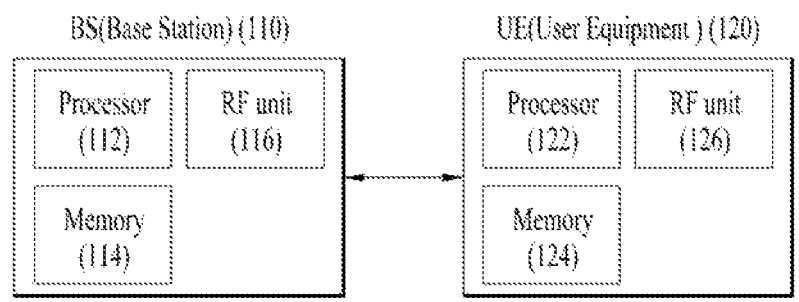
FIG. 24 is a diagram illustrating a BS 110 and a UE 120 to which the present invention is applicable.

FIG. 24 is a diagram illustrating a BS 110 and a UE 120 to which the present invention is applicable.

Referring to FIG. 24, a wireless communication system includes the BS 110 and the UE 120. When the wireless communication system includes a relay, the BS 110 or the UE 120 can be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/ receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/ receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for transmitting an acknowledgement/negative acknowledgement (ACK/NACK) by a user equipment (UE) in a wireless communication system, the method comprising:
receiving downlink grant information through a physical downlink control channel;
receiving downlink data through a physical downlink shared channel scheduled by downlink grant information; and
transmitting an ACK/NACK signal for the downlink data using a plurality of ACK/NACK resources comprising a first ACK/NACK resource and a second ACK/NACK resource,
wherein:
the physical downlink control channel is allocated to a data region of a subframe; and
the first ACK/NACK resource and the second ACK/NACK resource are respectively determined as an uplink resource linked to a first resource index and an uplink resource linked to a second resource index among resource indexes constituting the physical downlink control channel and resource indexes included in the physical downlink shared channel.

2. The method according to claim 1, wherein:
the first resource index is a lowest resource index of resource indexes constituting the physical downlink control channel; and
the second resource index is a lowest resource index of resource indexes included in the physical downlink shared channel.

3. The method according to claim 2, wherein, when a resource index included in the physical downlink shared channel is not present, the second resource index is indicated via a higher layer.

4. The method according to claim 1, wherein:
the first resource index is a lowest resource index of resource indexes included in the physical downlink shared channel; and the second resource index is a second lowest resource index of resource indexes included in the physical downlink shared channel.

5. The method according to claim 1, wherein:
the first resource index is a lowest resource index of resource indexes constituting the physical downlink control channel and resource indexes included in the physical downlink shared channel; and
the second resource index is a second lowest index of resource indexes constituting the physical downlink control channel and resource indexes included in the physical downlink shared channel.

6. The method according to claim 1, wherein, when the number of resources constituting the physical downlink control channel is 2 or more, the first resource index is a lowest resource index of resource indexes constituting the physical downlink control channel and the second resource index is a second lowest resource index of resource indexes constituting the physical downlink control channel.

7. The method according to claim 1, wherein the resource index is a control channel element (CCE) index or a physical resource block (PRB) index.

8. A user equipment (UE) for transmitting an acknowledgement/negative acknowledgement (ACK/NACK) in a wireless communication system, wherein:
the UE comprises a radio frequency (RF) unit, and a processor;
the processor is configured to receive downlink grant information through a physical downlink control channel, to receive downlink data through a physical downlink shared channel scheduled by downlink grant information, and to transmit an ACK/NACK signal for the downlink data using a plurality of ACK/NACK resources comprising a first ACK/NACK resource and a second ACK/NACK resource;
the physical downlink control channel is allocated to a data region of a subframe; and
the first ACK/NACK resource and the second ACK/NACK resource are respectively determined as an uplink resource linked to a first resource index and an uplink resource linked to a second resource index among resource indexes constituting the physical downlink control channel and resource indexes included in the physical downlink shared channel.

9. The UE according to claim 8, wherein:
the first resource index is a lowest resource index of resource indexes constituting the physical downlink control channel; and
the second resource index is a lowest resource index of resource indexes included in the physical downlink shared channel.

10. The UE according to claim 9, wherein, when a resource index included in the physical downlink shared channel is not present, the second resource index is indicated via a higher layer.

11. The UE according to claim 8, wherein:
the first resource index is a lowest resource index of resource indexes included in the physical downlink shared channel; and
the second resource index is a second lowest resource index of resource indexes included in the physical downlink shared channel.

12. The UE according to claim 8, wherein:
the first resource index is a lowest resource index of resource indexes constituting the physical downlink control channel and resource indexes included in the physical downlink shared channel; and
the second resource index is a second lowest index of resource indexes constituting the physical downlink control channel and resource indexes included in the physical downlink shared channel.

13. The UE according to claim 8, wherein, when the number of resources constituting the physical downlink control channel is 2 or more, the first resource index is a lowest resource index of resource indexes constituting the physical downlink control channel and the second resource index is a second lowest resource index of resource indexes constituting the physical downlink control channel.

14. The UE according to claim 8, wherein the resource index is a control channel element (CCE) index or a physical resource block (PRB) index.

* * * * *